US008425316B2

(12) United States Patent
Silva et al.

(10) Patent No.: US 8,425,316 B2

(45) Date of Patent: Apr. 23, 2013

(54) METHODS AND SYSTEMS FOR IMPROVING PLAY OF A BONUS GAME ON A GAMING MACHINE AND IMPROVING SECURITY WITHIN A GAMING ESTABLISHMENT

(75) Inventors: Gregory A. Silva, Reno, NV (US); Cari L. Blomquist, Reno, NV (US); Ryan M. Griffin, Reno, NV (US); Jean M. Venneman, Reno, NV (US)

(73) Assignee: IGT, Reno, NV (US)

( * ) Notice: Subject to any disclaimer, the term of this patent is extended or adjusted under 35 U.S.C. 154(b) by 150 days.

(21) Appl. No.: 12/849,284

(22) Filed: Aug. 3, 2010
(Under 37 CFR 1.47)

(65) Prior Publication Data

US 2012/0034975 A1 Feb. 9, 2012

(51) Int. Cl.
*A63F 9/24* (2006.01)
*A63F 13/00* (2006.01)

(52) U.S. Cl.
USPC .................. 463/30; 463/31; 463/32; 463/33; 463/34

(58) Field of Classification Search .............. 463/30-34, 463/46
See application file for complete search history.

(56) References Cited

U.S. PATENT DOCUMENTS

| | | | |
|---|---|---|---|
| 3,708,219 | A | 1/1973 | Forlini et al. |
| 4,333,715 | A | 6/1982 | Brooks |
| 4,517,558 | A | 5/1985 | Davids |
| 4,574,391 | A | 3/1986 | Morishima |
| 4,607,844 | A | 8/1986 | Fullerton |
| 4,659,182 | A | 4/1987 | Aizawa |
| 4,718,672 | A | 1/1988 | Okada |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,152,529 | A | 10/1992 | Okada |
| 5,319,491 | A | 6/1994 | Selbrede |

(Continued)

FOREIGN PATENT DOCUMENTS

| | | |
|---|---|---|
| AU | 721968 | 7/2000 |
| AU | 2000 PQ9586 | 8/2000 |

(Continued)

OTHER PUBLICATIONS

U.S. Appl. No. 09/622,409, filed Nov. 6, 2000, Engel.

(Continued)

*Primary Examiner* — Sunit Pandya
*Assistant Examiner* — Jasson Yoo
(74) *Attorney, Agent, or Firm* — Foley & Lardner LLP

(57) ABSTRACT

Methods and Systems for improving play of a bonus game on a gaming machine and improving security within a gaming establishment are described. The systems include a gaming machine, which includes an input device that receives an input from a user. The gaming machine further includes a first display device that displays a primary game upon receiving the input, and a second display device including a multilayer display that displays a secondary game. The multilayer display includes a foreground screen and a background screen, with at least a portion of the foreground screen or the background screen being curved and the foreground screen or the background screen displays an image of a wheel. The gaming machine further includes a controller configured to execute the primary and secondary games. The secondary game is played after playing the primary game.

30 Claims, 17 Drawing Sheets

U.S. PATENT DOCUMENTS 5,342,047 A 8/1994 Heidel et al.
5,364,100 A 11/1994 Ludlow et al.
5,375,830 A 12/1994 Takemoto et al.
5,376,587 A 12/1994 Buchmann et al.
5,393,057 A 2/1995 Marnell
5,393,061 A 2/1995 Manship et al.
5,395,111 A 3/1995 Inoue
5,467,893 A 11/1995 Landis, II et al.
5,539,547 A 7/1996 Ishii et al.
5,585,821 A 12/1996 Ishikura et al.
5,589,980 A 12/1996 Bass et al.
5,647,798 A 7/1997 Faiciglia
5,725,428 A 3/1998 Achmuller
5,745,197 A 4/1998 Leung et al.
5,752,881 A 5/1998 Inoue
5,762,552 A 6/1998 Vuong et al.
5,764,317 A 6/1998 Sadnovik et al.
5,785,315 A 7/1998 Eiteneer et al.
5,788,573 A 8/1998 Baerlocher et al.
5,833,537 A 11/1998 Barrie
5,851,148 A 12/1998 Brune et al.
5,853,324 A 12/1998 Kami et al.
5,910,046 A 6/1999 Wada et al.
5,923,307 A 7/1999 Hogle, IV
5,951,397 A 9/1999 Dickinson
5,956,180 A 9/1999 Bass et al.
5,967,893 A 10/1999 Lawrence et al.
5,988,638 A 11/1999 Rodesch et al.
5,993,027 A 11/1999 Yamamoto et al.
6,001,016 A 12/1999 Walker et al.
6,015,346 A 1/2000 Bennett
6,027,115 A 2/2000 Griswold et al.
6,050,895 A 4/2000 Luciano et al.
6,054,969 A 4/2000 Haisma
6,057,814 A 5/2000 Kalt
6,059,289 A 5/2000 Vancura
6,059,658 A 5/2000 Mangano et al.
6,068,552 A 5/2000 Walker
6,086,066 A 7/2000 Takeuchi et al.
6,093,102 A 7/2000 Bennett
6,135,884 A 10/2000 Hedrick et al.
6,159,095 A 12/2000 Frohm et al.
6,159,098 A 12/2000 Slomiany et al.
6,168,520 B1 1/2001 Baerlocher et al.
6,190,255 B1 2/2001 Thomas et al.
6,213,875 B1 4/2001 Suzuki
6,227,971 B1 5/2001 Weiss
6,234,897 B1 5/2001 Frohm et al.
6,244,596 B1 6/2001 Kondratjuk
6,251,013 B1 6/2001 Bennett
6,251,014 B1 6/2001 Stockdale et al.
6,252,707 B1 6/2001 Kleinberger et al.
6,254,481 B1 7/2001 Jaffe
6,261,178 B1 7/2001 Bennett
6,270,411 B1 8/2001 Gura et al.
6,297,785 B1 10/2001 Sommer et al.
6,315,666 B1 11/2001 Mastera et al.
6,322,445 B1 11/2001 Miller
6,337,513 B1 1/2002 Clevenger et al.
6,347,996 B1 2/2002 Gilmore et al.
6,368,216 B1 4/2002 Hedrick et al.
6,379,244 B1 4/2002 Sagawa et al.
6,398,220 B1 6/2002 Inoue
6,398,644 B1 * 6/2002 Perrie et al. .................... 463/18
6,404,436 B1 6/2002 Goden
6,444,496 B1 9/2002 Edwards et al.
6,445,185 B1 9/2002 Damadian et al.
6,491,583 B1 12/2002 Gauselmann
6,503,147 B1 1/2003 Stockdale et al.
6,511,375 B1 1/2003 Kaminkow
6,512,559 B1 1/2003 Hashimoto et al.
6,514,141 B1 2/2003 Kaminkow et al.
6,517,433 B2 2/2003 Loose et al.
6,517,437 B1 2/2003 Wells et al.
6,520,856 B1 2/2003 Walker et al.
6,532,146 B1 3/2003 Duquette
6,547,664 B2 4/2003 Saunders
6,575,541 B1 6/2003 Hedrick et al.
6,585,591 B1 7/2003 Baerlocher et al.
6,612,927 B1 9/2003 Slomiany
D480,961 S 10/2003 Deadman
6,643,124 B1 11/2003 Wilk
6,644,664 B2 11/2003 Muir et al.
6,646,695 B1 11/2003 Gauselmann
6,652,378 B2 11/2003 Cannon et al.
6,659,864 B2 12/2003 McGahn et al.
6,661,425 B1 12/2003 Hiroaki
6,695,696 B1 2/2004 Kaminkow
6,695,703 B1 2/2004 McGahn
6,702,675 B2 3/2004 Poole et al.
6,712,694 B1 3/2004 Nordman
6,715,756 B2 4/2004 Inoue
6,717,728 B2 4/2004 Putilin
6,722,979 B2 4/2004 Gilmore et al.
6,791,825 B1 9/2004 Taylor
6,802,777 B2 10/2004 Seelig et al.
6,817,945 B2 11/2004 Seelig et al.
6,817,946 B2 11/2004 Motegi et al.
6,859,219 B1 2/2005 Sall
6,887,157 B2 5/2005 LeMay et al.
6,890,259 B2 5/2005 Breckner et al.
6,890,262 B2 5/2005 Oishi et al.
6,906,762 B1 6/2005 Witehira et al.
6,908,381 B2 6/2005 Ellis
6,923,441 B2 * 8/2005 Inoue ........................ 273/143 R
6,937,298 B2 8/2005 Okada
6,981,635 B1 1/2006 Hughs-Baird et al.
7,040,987 B2 5/2006 Walker et al.
7,056,215 B1 6/2006 Olive
7,084,888 B2 8/2006 Takahama et al.
7,095,180 B2 8/2006 Emslie et al.
7,095,450 B1 8/2006 Holmes et al.
7,097,560 B2 8/2006 Okada
7,108,603 B2 9/2006 Olive
7,115,033 B1 10/2006 Timperley
7,128,647 B2 10/2006 Muir
7,159,865 B2 1/2007 Okada
7,160,187 B2 1/2007 Loose et al.
7,166,029 B2 1/2007 Enzminger
7,204,753 B2 4/2007 Ozaki et al.
7,207,883 B2 4/2007 Nozaki et al.
7,220,181 B2 5/2007 Okada
7,227,510 B2 6/2007 Mayer, III et al.
7,237,202 B2 6/2007 Gage
7,252,288 B2 8/2007 Seelig et al.
7,252,591 B2 8/2007 Van Asdale
7,255,643 B2 8/2007 Ozaki et al.
7,274,413 B1 9/2007 Sullivan et al.
7,285,049 B1 10/2007 Luciano, Jr. et al.
7,309,284 B2 12/2007 Griswold et al.
7,322,884 B2 1/2008 Emori et al.
7,324,094 B2 1/2008 Moilanen et al.
7,329,181 B2 2/2008 Hoshino et al.
7,352,424 B2 4/2008 Searle
7,439,683 B2 10/2008 Emslie
7,473,173 B2 1/2009 Peterson et al.
7,505,049 B2 3/2009 Engel
7,510,475 B2 3/2009 Loose et al.
7,558,057 B1 7/2009 Naksen et al.
7,559,837 B1 7/2009 Yoseloff et al.
7,582,016 B2 9/2009 Suzuki
7,619,585 B2 11/2009 Bell et al.
7,624,339 B1 11/2009 Engel et al.
7,626,594 B1 12/2009 Witehira et al.
7,654,899 B2 2/2010 Durham et al.
7,724,208 B1 5/2010 Engel et al.
7,730,413 B1 6/2010 Engel
7,742,124 B2 6/2010 Bell
7,742,239 B2 6/2010 Bell
7,841,944 B2 11/2010 Wells
7,951,001 B2 5/2011 Wells
8,012,010 B2 9/2011 Wilson et al.
8,092,304 B2 1/2012 Hedrick et al.
8,096,878 B2 1/2012 Durham et al.
8,115,700 B2 2/2012 Schlottmann et al.
8,118,670 B2 2/2012 Griswold et al.
8,128,477 B2 3/2012 Durham et al.

| | | | |
|---|---|---|---|
| 8,142,273 | B2 | 3/2012 | Williams et al. |
| 8,192,281 | B2 | 6/2012 | Williams et al. |
| 8,199,068 | B2 | 6/2012 | Williams et al. |
| 8,210,922 | B2 | 7/2012 | Williams et al. |
| 8,251,795 | B2 | 8/2012 | Durham et al. |
| 2001/0013681 | A1 | 8/2001 | Bruzzese et al. |
| 2001/0016513 | A1 | 8/2001 | Muir et al. |
| 2001/0031658 | A1 | 10/2001 | Ozaki et al. |
| 2001/0035868 | A1 | 11/2001 | Uehara et al. |
| 2002/0004421 | A1 | 1/2002 | Itai |
| 2002/0015305 | A1 | 2/2002 | Bornhorst et al. |
| 2002/0022518 | A1 | 2/2002 | Okuda et al. |
| 2002/0045472 | A1 | 4/2002 | Adams |
| 2002/0086725 | A1 | 7/2002 | Fasbender et al. |
| 2002/0119035 | A1 | 8/2002 | Hamilton |
| 2002/0142825 | A1 | 10/2002 | Lark et al. |
| 2002/0167637 | A1 | 11/2002 | Burke et al. |
| 2002/0173354 | A1 | 11/2002 | Winans et al. |
| 2002/0175466 | A1 | 11/2002 | Loose et al. |
| 2002/0183105 | A1 | 12/2002 | Cannon et al. |
| 2002/0183109 | A1 | 12/2002 | McGahn et al. |
| 2003/0026171 | A1 | 2/2003 | Brewer et al. |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0045345 | A1 | 3/2003 | Berman |
| 2003/0060271 | A1 | 3/2003 | Gilmore et al. |
| 2003/0064781 | A1 | 4/2003 | Muir |
| 2003/0069063 | A1 | 4/2003 | Bilyeu et al. |
| 2003/0087690 | A1 | 5/2003 | Loose et al. |
| 2003/0128427 | A1 | 7/2003 | Kalmanash et al. |
| 2003/0130026 | A1 | 7/2003 | Breckner et al. |
| 2003/0130028 | A1 | 7/2003 | Aida et al. |
| 2003/0148804 | A1 | 8/2003 | Ikeya et al. |
| 2003/0157980 | A1 | 8/2003 | Loose et al. |
| 2003/0176214 | A1 | 9/2003 | Burak et al. |
| 2003/0199295 | A1 | 10/2003 | Vancura |
| 2003/0220134 | A1 | 11/2003 | Walker et al. |
| 2003/0234489 | A1 | 12/2003 | Okada |
| 2003/0236114 | A1 | 12/2003 | Griswold et al. |
| 2003/0236118 | A1 | 12/2003 | Okada |
| 2004/0002372 | A1 | 1/2004 | Rodgers et al. |
| 2004/0009803 | A1 | 1/2004 | Bennett et al. |
| 2004/0023714 | A1 | 2/2004 | Asdale |
| 2004/0029636 | A1 | 2/2004 | Wells et al. |
| 2004/0036218 | A1 | 2/2004 | Inoue |
| 2004/0048645 | A1 | 3/2004 | Webb et al. |
| 2004/0048673 | A1 | 3/2004 | Kaminkow |
| 2004/0053660 | A1 | 3/2004 | Webb et al. |
| 2004/0063490 | A1 | 4/2004 | Okada |
| 2004/0066475 | A1 | 4/2004 | Searle |
| 2004/0077404 | A1 | 4/2004 | Schlottmann et al. |
| 2004/0102244 | A1 | 5/2004 | Kryuchkov et al. |
| 2004/0102245 | A1 | 5/2004 | Escalera et al. |
| 2004/0116178 | A1 | 6/2004 | Okada |
| 2004/0142748 | A1 | 7/2004 | Loose et al. |
| 2004/0147303 | A1 | 7/2004 | Imura et al. |
| 2004/0150162 | A1 | 8/2004 | Okada |
| 2004/0162146 | A1 | 8/2004 | Ooto |
| 2004/0166925 | A1 | 8/2004 | Emori et al. |
| 2004/0166927 | A1 | 8/2004 | Okada |
| 2004/0171423 | A1 | 9/2004 | Silva et al. |
| 2004/0183251 | A1 | 9/2004 | Inoue |
| 2004/0183972 | A1 | 9/2004 | Bell |
| 2004/0192430 | A1 | 9/2004 | Burak et al. |
| 2004/0198485 | A1 | 10/2004 | Loose et al. |
| 2004/0207154 | A1 | 10/2004 | Okada |
| 2004/0209666 | A1 | 10/2004 | Tashiro et al. |
| 2004/0209667 | A1 | 10/2004 | Emori et al. |
| 2004/0209668 | A1 | 10/2004 | Okada |
| 2004/0209671 | A1 | 10/2004 | Okada |
| 2004/0209672 | A1 | 10/2004 | Okada |
| 2004/0209678 | A1 | 10/2004 | Okada |
| 2004/0209683 | A1 | 10/2004 | Okada |
| 2004/0214635 | A1 | 10/2004 | Okada |
| 2004/0214637 | A1 | 10/2004 | Nonaka |
| 2004/0219967 | A1 | 11/2004 | Giobbi et al. |
| 2004/0224747 | A1 | 11/2004 | Okada |
| 2004/0227721 | A1 | 11/2004 | Moilanen et al. |
| 2004/0233663 | A1 | 11/2004 | Emslie et al. |
| 2004/0235558 | A1 | 11/2004 | Beaulieu et al. |
| 2004/0239582 | A1 | 12/2004 | Seymour |
| 2004/0266515 | A1 | 12/2004 | Gauselmann |
| 2004/0266536 | A1 | 12/2004 | Mattice et al. |
| 2005/0020348 | A1 | 1/2005 | Thomas et al. |
| 2005/0026673 | A1 | 2/2005 | Paulsen et al. |
| 2005/0032571 | A1 | 2/2005 | Asonuma |
| 2005/0037843 | A1 | 2/2005 | Wells et al. |
| 2005/0049032 | A1 | 3/2005 | Kobayashi |
| 2005/0049033 | A1 | 3/2005 | Kojima |
| 2005/0049046 | A1 | 3/2005 | Kobayashi |
| 2005/0052341 | A1 | 3/2005 | Henriksson |
| 2005/0062410 | A1 | 3/2005 | Bell et al. |
| 2005/0063055 | A1 | 3/2005 | Engel |
| 2005/0079913 | A1 | 4/2005 | Inamura |
| 2005/0085292 | A1 | 4/2005 | Inamura |
| 2005/0145366 | A1 | 7/2005 | Erel |
| 2005/0153775 | A1 | 7/2005 | Griswold et al. |
| 2005/0164786 | A1 | 7/2005 | Connelly |
| 2005/0176493 | A1 | 8/2005 | Nozaki et al. |
| 2005/0192090 | A1 | 9/2005 | Muir et al. |
| 2005/0206582 | A1 | 9/2005 | Bell et al. |
| 2005/0208994 | A1 | 9/2005 | Berman |
| 2005/0233799 | A1 | 10/2005 | LeMay et al. |
| 2005/0239539 | A1 | 10/2005 | Inamura |
| 2005/0253775 | A1 | 11/2005 | Stewart |
| 2005/0255908 | A1 | 11/2005 | Wells et al. |
| 2005/0266912 | A1 | 12/2005 | Sekiguchi |
| 2005/0285337 | A1 | 12/2005 | Durham et al. |
| 2006/0025199 | A1 | 2/2006 | Harkins et al. |
| 2006/0058100 | A1 | 3/2006 | Pacey et al. |
| 2006/0063580 | A1 | 3/2006 | Nguyen et al. |
| 2006/0073881 | A1 | 4/2006 | Pryzby |
| 2006/0100014 | A1 | 5/2006 | Griswold et al. |
| 2006/0103951 | A1 | 5/2006 | Bell et al. |
| 2006/0111179 | A1 | 5/2006 | Inamura |
| 2006/0125745 | A1 | 6/2006 | Evanicky |
| 2006/0148553 | A1 | 7/2006 | Dodge |
| 2006/0166727 | A1 | 7/2006 | Burak |
| 2006/0191177 | A1 | 8/2006 | Engel |
| 2006/0256033 | A1 | 11/2006 | Chan et al. |
| 2006/0284574 | A1 | 12/2006 | Emslie et al. |
| 2006/0290594 | A1 | 12/2006 | Engel |
| 2007/0004510 | A1 | 1/2007 | Underdahl et al. |
| 2007/0004513 | A1 | 1/2007 | Wells et al. |
| 2007/0010315 | A1 | 1/2007 | Hein |
| 2007/0054723 | A1 | 3/2007 | Mattice et al. |
| 2007/0057866 | A1 | 3/2007 | Lee et al. |
| 2007/0072665 | A1 | 3/2007 | Muir |
| 2007/0077986 | A1 | 4/2007 | Loose |
| 2007/0091011 | A1 | 4/2007 | Selbrede |
| 2007/0105610 | A1 | 5/2007 | Anderson |
| 2007/0105611 | A1 | 5/2007 | O'Halloran |
| 2007/0105628 | A1 | 5/2007 | Arbogast et al. |
| 2007/0167208 | A1 * | 7/2007 | Acres .............................. 463/16 |
| 2007/0252804 | A1 | 11/2007 | Engel |
| 2008/0004104 | A1 | 1/2008 | Durham et al. |
| 2008/0007486 | A1 | 1/2008 | Fujinawa et al. |
| 2008/0020816 | A1 | 1/2008 | Griswold et al. |
| 2008/0020839 | A1 | 1/2008 | Wells et al. |
| 2008/0020840 | A1 | 1/2008 | Wells et al. |
| 2008/0020841 | A1 | 1/2008 | Wells et al. |
| 2008/0064497 | A1 | 3/2008 | Griswold et al. |
| 2008/0068290 | A1 | 3/2008 | Muklashy et al. |
| 2008/0096655 | A1 | 4/2008 | Rasmussen et al. |
| 2008/0108422 | A1 | 5/2008 | Hedrick et al. |
| 2008/0113716 | A1 | 5/2008 | Beadell et al. |
| 2008/0113745 | A1 | 5/2008 | Williams et al. |
| 2008/0113746 | A1 | 5/2008 | Williams et al. |
| 2008/0113747 | A1 | 5/2008 | Williams et al. |
| 2008/0113748 | A1 | 5/2008 | Williams et al. |
| 2008/0113749 | A1 | 5/2008 | Williams et al. |
| 2008/0113756 | A1 | 5/2008 | Williams et al. |
| 2008/0113775 | A1 | 5/2008 | Williams et al. |
| 2008/0125219 | A1 | 5/2008 | Williams et al. |
| 2008/0136741 | A1 | 6/2008 | Williams et al. |
| 2008/0261674 | A9 | 10/2008 | Okada |
| 2008/0284792 | A1 | 11/2008 | Bell |

2009/0036208 A1 2/2009 Pennington et al.
2009/0061983 A1 3/2009 Kaufman et al.
2009/0061984 A1 3/2009 Yi et al.
2009/0069069 A1 3/2009 Crowder, Jr. et al.
2009/0069070 A1 3/2009 Crowder, Jr. et al.
2009/0079667 A1 3/2009 Schlottmann et al.
2009/0082083 A1 3/2009 Wilson et al.
2009/0091513 A1 4/2009 Kuhn
2009/0104989 A1 4/2009 Williams et al.
2009/0111577 A1 4/2009 Mead
2009/0117993 A1 5/2009 Bigelow, Jr. et al.
2009/0215523 A1 8/2009 Acres
2009/0258697 A1 10/2009 Kelly et al.
2009/0258701 A1 10/2009 Crowder, Jr. et al.
2009/0280888 A1 11/2009 Durham et al.
2009/0312095 A1 12/2009 Durham et al.
2010/0045601 A1 2/2010 Engel et al.
2010/0048288 A1* 2/2010 Canterbury et al. ............ 463/20
2010/0115391 A1 5/2010 Engel et al.
2010/0115439 A1 5/2010 Engel
2010/0120500 A1 5/2010 Rodgers et al.
2010/0190545 A1 7/2010 Lauzon et al.
2010/0214195 A1 8/2010 Ogasawara et al.
2010/0234089 A1 9/2010 Saffari et al.
2011/0065490 A1 3/2011 Lutnick et al.
2011/0201404 A1 8/2011 Wells
2011/0254932 A1* 10/2011 Doung ............................ 348/56
2011/0294562 A1 12/2011 Wilson et al.

FOREIGN PATENT DOCUMENTS

CA 2265283 9/1999
CA 2428858 5/2002
CN 1137651 12/1996
CN 1208210 2/1999
EP 0 454 423 10/1991
EP 0 484 103 5/1992
EP 0 860 807 8/1998
EP 0 919 965 6/1999
EP 0 997 857 5/2000
EP 1 000 642 5/2000
EP 1 260 928 11/2002
EP 1 282 088 2/2003
EP 1 369 830 12/2003
EP 1 391 847 2/2004
EP 1 462 152 9/2004
EP 1 465 126 10/2004
EP 1 492 063 12/2004
EP 1 571 626 9/2005
EP 1 762 992 3/2007
EP 1 826 739 8/2007
GB 1 464 896 2/1977
GB 2 120 506 11/1983
GB 2 253 300 9/1992
GB 2 316 214 2/1998
GB 2 385 004 8/2003
JP H02-90884 7/1990
JP H03-20388 2/1991
JP 04-220276 8/1992
JP H05-68585 9/1993
JP 06-043425 2/1994
JP 07-124290 5/1995
JP H10-015247 1/1998
JP 10-234932 9/1998
JP 11-000441 1/1999
JP H11-137852 5/1999
JP 2000-245963 9/2000
JP 2000-300729 10/2000
JP 2000-350805 12/2000
JP 2000-354685 12/2000
JP 2001-062032 3/2001
JP 2001-238995 9/2001
JP 2001-252393 9/2001
JP 2001-252394 9/2001
JP 2001-353254 12/2001
JP 2002-085624 3/2002
JP 2004-105616 4/2004
JP 2004-166879 6/2004
JP 2004-350869 12/2004
JP 2005-253561 9/2005
JP 2005-266387 9/2005
JP 2005-266388 9/2005
JP 2005-274906 10/2005
JP 2005-274907 10/2005
JP 2005-283864 10/2005
JP 2006-043425 2/2006
JP 2006-059607 3/2006
JP 2006-346226 12/2006
JP 2007-200869 8/2007
RU 2 053 559 1/1996
RU 2 145 116 1/2000
RU 29794 5/2003
WO WO 93/13446 7/1993
WO WO 99/42889 8/1999
WO WO 99/44095 9/1999
WO WO 99/53454 10/1999
WO WO 00/32286 6/2000
WO WO 01/15127 3/2001
WO WO 01/15128 3/2001
WO WO 01/15132 3/2001
WO WO 01/38926 5/2001
WO WO 01/09664 8/2001
WO WO 02/38234 5/2002
WO WO 02/41046 5/2002
WO WO 02/084637 10/2002
WO WO 02/086610 10/2002
WO WO 02/089102 11/2002
WO WO 03/001486 1/2003
WO WO 03/023491 3/2003
WO WO 03/032058 4/2003
WO WO 03/039699 5/2003
WO WO 03/040820 5/2003
WO PCT/NZ2003/00153 7/2003
WO WO 03/079094 9/2003
WO WO 04/001486 12/2003
WO WO 04/001488 12/2003
WO WO 04/002143 12/2003
WO WO 2004/008226 1/2004
WO WO 2004/023825 3/2004
WO WO 2004/025583 3/2004
WO WO 2004/036286 4/2004
WO WO 2004/060512 7/2004
WO WO 2004/079674 9/2004
WO WO 2004/102520 11/2004
WO WO 2005/071629 8/2005
WO WO 2006/034192 3/2006
WO WO 2006/038819 4/2006
WO WO 2006/112740 10/2006
WO WO 2007/040413 4/2007
WO WO 2008/005278 1/2008
WO WO 2008/028153 3/2008
WO WO 2008/048857 4/2008
WO WO 2008/061068 5/2008
WO WO 2008/062914 5/2008
WO WO 2008/063908 5/2008
WO WO 2008/063914 5/2008
WO WO 2008/063952 5/2008
WO WO 2008/063956 5/2008
WO WO 2008/063968 5/2008
WO WO 2008/063969 5/2008
WO WO 2008/063971 5/2008
WO WO 2008/079542 7/2008
WO WO 2009/029720 3/2009
WO WO 2009/039245 3/2009
WO WO 2009/039295 3/2009
WO WO 2009/054861 4/2009
WO WO 2010/023537 3/2010
WO WO 2010/039411 4/2010

OTHER PUBLICATIONS

U.S. Appl. No. 13/443,770, filed Apr. 10, 2012, Frabbiele et al.
U.S. Office Action dated Mar. 30, 2010 issued in U.S. Appl. No. 11/938,086.
U.S Office Action Final dated Aug. 19, 2010 issued in U.S. Appl. No. 11/938,086.
U.S Office Action dated Dec. 3, 2010 issued in U.S. Appl. No. 11/938,086.

U.S Notice of Allowance dated Apr. 18, 2011 issued in U.S. Appl. No. 11/938,086.
U.S Notice of Allowance dated Oct. 7, 2011 issued in U.S. Appl. No. 11/938,086.
U.S. Office Action dated Oct. 9, 2009 issued in U.S. Appl. No. 11/514,808.
U.S. Office Action Final dated Apr. 22, 2010 issued in U.S. Appl. No. 11/514,808.
U.S. Office Action and Examiner Interview Summary dated Oct. 18, 2010 issued in U.S. Appl. No. 11/514,808.
U.S. Office Action Final dated Apr. 27, 2011 issued in U.S. Appl. No. 11/514,808.
U.S. Office Action dated Dec. 2, 2009 issued in U.S. Appl. No. 11/829,852.
U.S. Office Action dated Jul. 14, 2010 issued in U.S. Appl. No. 11/829,852.
U.S. Office Action dated Nov. 14, 2008 issued in U.S. Appl. No. 11/829,853.
U.S. Office Action dated Oct. 31, 2008 issued in U.S. Appl. No. 11/829,849.
U.S. Office Action dated Oct. 5, 2011 issued in U.S. Appl. No. 12/245,490.
U.S. Office Action Final dated May 3, 2012 issued in U.S. Appl. No. 12/245,490.
U.S Office Action dated Aug. 29, 2007 issued in U.S. Appl. No. 10/755,598.
U.S Office Action Final dated Apr. 23, 2008 issued in U.S. Appl. No. 10/755,598.
U.S Office Action dated Oct. 8, 2008 issued in U.S. Appl. No. 10/755,598.
U.S Office Action Final dated Jul. 1, 2009 issued in U.S. Appl. No. 10/755,598.
U.S Office Action Final dated Jan. 22, 2010 issued in U.S. Appl. No. 10/755,598.
U.S Office Action Final dated Aug. 4, 2010 issued in U.S. Appl. No. 10/755,598.
U.S Notice of Panel Decision from Pre-Appeal Brief Review dated Dec. 1, 2010 issued in U.S. Appl. No. 10/755,598.
U.S Office Action dated Mar. 28, 2011 issued in U.S. Appl. No. 10/755,598.
U.S Office Action Final dated Nov. 8, 2011 issued in U.S. Appl. No. 10/755,598.
U.S Office Action dated Oct. 31, 2008 issued in U.S. Appl. No. 11/829,917.
U.S Office Action Final dated Aug. 11, 2009 issued in U.S. Appl. No. 11/829,917.
U.S Office Action dated Jan. 29, 2010 issued in U.S. Appl. No. 11/829,917.
U.S Office Action Final dated Aug. 5, 2010 issued in U.S. Appl. No. 11/829,917.
U.S. Office Action dated Jun. 23, 2009 issued in U.S. Appl. No. 11/938,151.
U.S. Office Action Final dated Feb. 8, 2010 issued in U.S. Appl. No. 11/938,151.
U.S. Advisory Action dated Apr. 22, 2010 issued in U.S. Appl. No. 11/938,151.
U.S. Office Action dated Jul. 23, 2010 issued in U.S. Appl. No. 11/938,151.
U.S. Office Action Final dated Jan. 4, 2011 issued in U.S. Appl. No. 11/938,151.
U.S. Office Action (Notice of Panel Decision from Pre-Appeal Brief Review) dated Apr. 27, 2011 issued in U.S. Appl. No. 11/938,151.
U.S. Notice of Allowance dated Sep. 12, 2011 issued in U.S. Appl. No. 11/938,151.
U.S. Notice of Allowance and Allowability dated Jan. 9, 2012 issued in U.S. Appl. No. 11/938,151.
U.S. Amendment After Allowance—Rule 1.312 dated Jan. 26, 2012 issued in U.S. Appl. No. 11/938,151.
U.S. Office Action dated Jul. 9, 2010 issued in U.S. Appl. No. 11/858,849.
U.S. Office Action Final dated Nov. 30, 2010 issued in U.S. Appl. No. 11/858,849.
U.S. Office Action dated Mar. 22, 2011 issued in U.S. Appl. No. 11/858,849.
U.S. Office Action Final dated Aug. 11, 2011 issued in U.S. Appl. No. 11/858,849.
U.S. Office Action (Advisory Action) dated Dec. 2, 2011 issued in U.S. Appl. No. 11/858,849.
U.S. Notice of Allowance and Allowability dated Dec. 14, 2011 issued in U.S. Appl. No. 11/858,849.
U.S. Office Action dated Jul. 9, 2009 issued in U.S. Appl. No. 11/858,700.
U.S. Office Action Final dated Jan. 4, 2010 issued in U.S. Appl. No. 11/858,700.
U.S. Office Action Final dated Apr. 7, 2010 issued in U.S. Appl. No. 11/858,700.
U.S. Office Action dated Aug. 5, 2010 issued in U.S. Appl. No. 11/858,700.
U.S. Office Action Final dated Dec. 27, 2010 issued in U.S. Appl. No. 11/858,700.
U.S. Office Action dated Nov. 18, 2011 issued in U.S. Appl. No. 11/858,700.
U.S. Office Action dated Apr. 25, 2012 issued in U.S. Appl. No. 11/858,700.
U.S. Office Action dated Jul. 9, 2009 issued in U.S. Appl. No. 11/858,695.
U.S. Office Action Final dated Jan. 4, 2010 issued in U.S. Appl. No. 11/858,695.
U.S. Office Action Final dated Mar. 29, 2010 issued in U.S. Appl. No. 11/858,695.
U.S. Office Action Final dated Jul. 7, 2010 issued in U.S. Appl. No. 11/858,695.
U.S. Office Action dated Nov. 28, 2011 issued in U.S. Appl. No. 11/858,695.
U.S. Notice of Allowance dated Apr. 25, 2012 issued in U.S. Appl. No. 11/858,695.
U.S. Allowed Claims dated Sep. 5, 2012 issued in U.S. Appl. No. 11/858,695.
U.S. Notice of Allowance dated Sep. 5, 2012 issued in U.S. Appl. No. 11/858,695.
U.S. Office Action dated Apr. 28, 2011 issued in U.S. Appl. No. 11/858,793.
U.S. Notice of Allowance dated Oct. 12, 2011 issued in U.S. Appl. No. 11/858,793.
U.S. Notice of Allowance dated Feb. 1, 2012 issued in U.S. Appl. No. 11/858,793.
U.S. Office Action dated Jul. 9, 2009 issued in U.S. Appl. No. 11/858,693.
U.S. Office Action Final dated Mar. 23, 2010 issued in U.S. Appl. No. 11/858,693.
U.S. Advisory Action dated Jun. 1, 2010 issued in U.S. Appl. No. 11/858,693.
U.S. Office Action dated Aug. 5, 2010 issued in U.S. Appl. No. 11/858,693.
U.S. Office Action Final dated Feb. 7, 2011 issued in U.S. Appl. No. 11/858,693.
U.S. Notice of Allowance dated Nov. 21, 2011 issued in U.S. Appl. No. 11/858,693.
U.S. Notice of Allowance dated Feb. 29, 2012 issued in U.S. Appl. No. 11/858,693.
U.S. Office Action dated Jul. 10, 2009 issued in U.S. Appl. No. 11/858,845.
U.S. Office Action Final dated Feb. 5, 2010 issued in U.S. Appl. No. 11/858,845.
U.S. Notice of Panel Decision from Pre-Appeal Brief Review dated Jun. 8, 2010 issued in U.S. Appl. No. 11/858,845.
U.S. Office Action dated May 1, 2012 issued in U.S. Appl. No. 11/858,845.
U.S. Notice of Allowance dated Oct. 30, 2012 issued in U.S. Appl. No. 11/858,845.
U.S. Miscellaneous Communication dated Nov. 23, 2012 issued in U.S. Appl. No. 11/858,845.
U.S. Office Action dated Apr. 7, 2011 issued in U.S. Appl. No. 11/849,119.

U.S. Office Action Final dated Sep. 6, 2011 issued in U.S. Appl. No. 11/849,119.
U.S. Office Action dated Nov. 12, 2010 issued in U.S. Appl. No. 11/859,127.
U.S. Notice of Allowance dated May 4, 2011 issued in U.S. Appl. No. 11/859,127.
Third Party Submission for U.S. Appl. No. 13/207,260 dated Jan. 31, 2012.
U.S. Notice of Allowance dated Jun. 1, 2012 issued in U.S. Appl. No. 13/207,260.
U.S. Allowed Claims dated Sep. 11, 2012 issued in U.S. Appl. No. 13/207,260.
U.S. Notice of Allowance dated Sep. 11, 2012 issued in U.S. Appl. No. 13/207,260.
U.S. Office Action dated Jan. 20, 2011 issued in U.S. Appl. No. 11/983,770.
U.S. Office Action Final dated May 16, 2011 issued in U.S. Appl. No. 11/983,770.
U.S. Office Action dated Jan. 20, 2012 issued in U.S. Appl. No. 11/877,611.
U.S. Office Action Final dated Aug. 10, 2012 issued in U.S. Appl. No. 11/877,611.
U.S. Office Action dated Jun. 13, 2003 issued in U.S. Appl. No. 09/966,851.
U.S. Office Action dated Mar. 30, 2004 issued in U.S. Appl. No. 09/966,851.
U.S. Office Action Final dated Dec. 14, 2004 issued in U.S. Appl. No. 09/966,851.
U.S. Notice of Allowance dated Jun. 13, 2006 issued in U.S. Appl. No. 09/966,851.
U.S. Office Action dated Sep. 9, 2009 issued in U.S. Appl. No. 11/549,258.
U.S. Office Action Final dated Mar. 26, 2010 issued in U.S. Appl. No. 11/549,258.
U.S. Office Action dated Jul. 9, 2010 issued in U.S. Appl. No. 11/549,258.
U.S. Office Action Final dated Dec. 21, 2010 issued in U.S. Appl. No. 11/549,258.
U.S. Office Action dated Oct. 4, 2011 issued in U.S. Appl. No. 11/549,258.
U.S. Office Action Final dated Oct. 2, 2012 issued in U.S. Appl. No. 11/549,258.
U.S. Office Action dated Sep. 3, 2010 issued in U.S. Appl. No. 11/938,632.
U.S. Office Action Final dated Dec. 15, 2010 issued in U.S. Appl. No. 11/938,632.
U.S. Notice of Allowance dated May 27, 2011 issued in U.S. Appl. No. 11/938,632.
U.S. Notice of Allowance dated Oct. 5, 2011 issued in U.S. Appl. No. 11/938,632.
U.S. Notice of Allowance dated Jan. 25, 2012 issued in U.S. Appl. No. 11/938,632.
U.S. Office Action dated Jun. 23, 2009 issued in U.S. Appl. No. 11/938,184.
U.S. Office Action Final dated Feb. 8, 2010 issued in U.S. Appl. No. 11/938,184.
U.S. Office Action dated Aug. 5, 2010 issued in U.S. Appl. No. 11/938,184.
U.S. Office Action Final dated Jan. 20, 2011 issued in U.S. Appl. No. 11/938,184.
U.S Office Action dated Nov. 17, 2004 issued in U.S. Appl. No. 10/376,852.
U.S Office Action dated Apr. 13, 2005 issued in U.S. Appl. No. 10/376,852.
U.S Office Action Final dated Nov. 18, 2005 issued in U.S. Appl. No. 10/376,852.
U.S Office Action dated Sep. 19, 2006 issued in U.S. Appl. No. 10/376,852.
U.S Notice of Informal or Non-Responsive Amendment dated Mar. 9, 2007 issued in U.S. Appl. No. 10/376,852.
U.S Office Action Final dated Jun. 22, 2007 issued in U.S. Appl. No. 10/376,852.
U.S. Office Action dated Jan. 28, 2008 issued in U.S. Appl. No. 10/376,852.
U.S Office Action Final dated Aug. 6, 2008 issued in U.S. Appl. No. 10/376,852.
U.S Office Action dated Feb. 2, 2009 issued in U.S. Appl. No. 10/376,852.
U.S Notice of Allowance dated Nov. 10, 2009 issued in U.S. Appl. No. 10/376,852.
U.S Office Action dated Mar. 25, 2010 issued in U.S. Appl. No. 10/376,852.
Third Party Submission for U.S. Appl. No. 12/849,284 dated Apr. 9, 2012.
U.S. Office Action dated Aug. 31, 2004 issued in U.S. Appl. No. 10/213,626.
U.S. Office Action Final dated Jan. 10, 2006 issued in U.S. Appl. No. 10/213,626.
U.S. Office Action dated Apr. 27, 2006 issued in U.S. Appl. No. 10/213,626.
U.S. Office Action Final dated Mar. 28, 2007 issued in U.S. Appl. No. 10/213,626.
U.S. Office Action dated Oct. 31, 2007 issued in U.S. Appl. No. 10/213,626.
U.S. Office Action Final dated Aug. 29, 2008 issued in U.S. Appl. No. 10/213,626.
U.S. Office Action dated Jul. 9, 2009 issued in U.S. Appl. No. 10/213,626.
U.S. Notice of Allowance and Examiner Interview Summary dated Mar. 1, 2010 issued in U.S. Appl. No. 10/213,626.
U.S. Notice of Allowance dated Jun. 22, 2010 issued in U.S. Appl. No. 10/213,626.
U.S. Notice of Allowance dated Oct. 4, 2010 issued in U.S. Appl. No. 10/213,626.
U.S. Office Action dated May 24, 2007 issued in U.S. Appl. No. 11/167,655.
U.S. Office Action dated Jan. 3, 2008 issued in U.S. Appl. No. 11/167,655.
U.S. Office Action Final dated Mar. 8, 2008 issued in U.S. Appl. No. 11/167,655.
U.S. Office Action Final dated Sep. 2, 2008 issued in U.S. Appl. No. 11/167,655.
U.S. Office Action dated Jul. 17, 2009 issued in U.S. Appl. No. 11/167,655.
U.S. Notice of Allowance dated Mar. 11, 2010 issued in U.S. Appl. No. 11/167,655.
U.S. Notice of Allowance dated Jul. 7, 2010 issued in U.S. Appl. No. 11/167,655.
U.S. Notice of Allowance dated Dec. 10, 2010 issued in U.S. Appl. No. 11/167,655.
U.S. Notice of Allowance dated Apr. 1, 2011 issued in U.S. Appl. No. 11/167,655.
Third Party Submission filed for U.S. Appl. No. 13/094,259 dated Oct. 18, 2011.
U.S. Office Action dated Sep. 17, 2012 issued in U.S. Appl. No. 13/094,259.
PCT International Search Report dated Apr. 9, 2008 issued in WO 2008/028153.
PCT Written Opinion dated Apr. 9, 2008 issued in WO 2008/028153.
PCT International Preliminary Report on Patentability and Written Opinion dated Mar. 3, 2009 issued in WO 2008/028153.
Australian Examiner's first report dated Jul. 25, 2011 issued in AU 2007289050.
European Examination Report dated Oct. 5, 2009 issued in EP 07 814 629.7.
PCT International Search Report dated Dec. 7, 2009 issued in WO 2010/039411.
PCT International Search Report dated May 25, 2005 issued in WO 2005/071629.
PCT Written Opinion dated May 25, 2005 issued in WO 2005/071629.
PCT International Preliminary Report on Patentability and Written Opinion dated Jul. 17, 2006 issued in WO 2005/071629.
Australian Examiner's First Report dated Nov. 12, 2009 issued in AU2005207309.

Australian Examiner's Report No. 2 dated Sep. 15, 2010 issued in AU Application No. 2005207309.
Canadian Office Action dated Sep. 10, 2012 issued in CA 2,553,321.
Chinese First Office Action dated Nov. 28, 2008 issued in CN2005800022940.
Chinese Second Office Action dated Sep. 25, 2009, issued in CN2005800022940.
Chinese Third Office Action dated May 11, 2010 issued in CN2005800022940.
EP Examination Report dated Sep. 13, 2007 issued in EP 05 705 315.9.
Mexican Office Action (as described by foreign attorney) dated Jun. 18, 2009 issued for MX 06/07950.
Russian Examination and Resolution on Granting Patent dated Jul. 18, 2008 issued in RU 2006-128289-09.
PCT International Search Report dated May 2, 2008 issued in WO 2008/061068.
PCT Written Opinion dated May 2, 2008 issued in WO 2008/061068.
PCT International Preliminary Report on Patentability and Written Opinion dated May 12, 2009 issued in WO 2008/061068.
Australian Examiner's first report dated Jul. 7, 2011 issued in AU 2007319331.
EP Examination Report dated Oct. 28, 2009 issued in EP 07 845 059.0 1238.
PCT International Search Report dated May 20, 2008 issued in WO 2008/063952.
PCT International Search Report and Written Opinion dated May 20, 2008 issued in WO 2008/063952.
PCT International Preliminary Report on Patentability and Written Opinion dated May 19, 2009 issued in WO 2008/063952.
Australian Examiner's first report dated Aug. 2, 2011 issued in AU 2007323945.
Australian Examiner's report No. 2 dated Feb. 10, 2012 issued in AU 2007323945.
European Examination Report dated Oct. 28, 2009 issued in EP 07 864 281.6.
PCT International Search Report dated Dec. 18, 2008 issued in WO 2009/039245.
PCT Written Opinion dated Dec. 18, 2008 issued in WO 2009/039245.
PCT International Preliminary Report on Patentability and Written Opinion dated Mar. 24, 2010 issued in WO 2009/039245.
PCT International Search Report dated May 7, 2008 issued in WO 2008/063914.
PCT Written Opinion dated May 7, 2008 issued in WO 2008/063914.
PCT International Preliminary Examination Report on Patentability and Written Opinion dated May 19, 2009 issued in WO 2008/063914.
Australian Examiner's first report dated Jul. 25, 2011 issued in AU 2007324000.
Australian Patent Examination Report No. 2 dated Jul. 31, 2012 issued in AU 2007324000.
Australian Patent Examination Report No. 3 dated Nov. 8, 2012 issued in AU 2007324000.
European Examination Report dated Oct. 28, 2009 issued in EP 07 844 998.0.
PCT International Search Report dated May 14, 2008 issued in WO 2008/063956.
PCT Written Opinion dated May 14, 2008 issued in WO 2008/063956.
PCT International Preliminary Report on Patentability and Written Opinion dated May 19, 2009 issued in WO 2008/063956.
Australian Examiner's First Report dated Aug. 4, 2011 issued in AU 2007323949.
Australian Patent Examination Report No. 2 dated Jun. 27, 2012 issued in AU 2007323949.
Australian Patent Examination Report No. 3 dated Aug. 23, 2012 issued in AU 2007323949.
Australian Patent Examination Report No. 4 dated Nov. 15, 2012 issued in AU 2007323949.
PCT International Search Report dated May 8, 2008 issued in issued in WO 2008/063908.
PCT Written Opinion dated May 8, 2008 issued in issued in WO 2008/063908.
PCT International Preliminary Report on Patentability and Written Opinion dated May 19,2009 issued in WO 2008/063908.
Australian Examiner's first report dated Jul. 25, 2011 issued in AU 2007323994.
PCT International Search Report dated Jun. 11, 2008 issued in WO 2008/079542.
PCT Written Opinion dated Jun. 11, 2008 issued in WO 2008/079542.
PCT International Preliminary Report on Patentability and Written Opinion dated May 19, 2009 issued in WO 2008/079542.
Australian Examiner's first report dated Aug. 2, 2011 issued in AU 2007338512.
European Examination Report dated Oct. 28, 2009 issued in EP 07 872 343.4.
PCT International Search Report dated May 20, 2008 issued in WO 2008/063971.
PCT Written Opinion dated May 20, 2008 issued in WO 2008/063971.
PCT International Preliminary Report on Patentability and Written Opinion dated May 19, 2009 issued in WO 2008/063971.
Australian Examiner's first report dated Aug. 2, 2011 issued in AU 2007323964.
Australian Patent Examination Report No. 2 dated Jul. 11, 2012 issued in AU 2007323964.
European Examination Report dated Oct. 28, 2009 issued in EP 07 845 062.4.
PCT International Search Report dated Dec. 11, 2008 issued in PCT/US2008/076881 [WO 2009/039295].
PCT Written Opinion dated Dec. 11, 2008 issued in PCT/US2008/076881 [WO 2009/039295].
PCT International Preliminary Report on Patentability and Written Opinion dated Mar. 24, 2010 issued in PCT/US2008/076881 [WO 2009/039295].
PCT International Search Report dated Jul. 16, 2008 issued in WO2009/054861.
PCT Written Opinion dated Jul. 16, 2008 issued in W02009/054861.
PCT International Preliminary Report on Patentability and Written Opinion dated Apr. 27, 2010 issued in WO 2009/054861.
Australian Examiner's First Report dated Sep. 22, 2005 issued in AU 29246/02.
Australian Notice of Opposition by Aristocrat Technologies dated Apr. 8, 2009 issued in AU 2007200982.
Australian Statement of Grounds and Particulars in Support of Opposition by Aristocrat Technologies dated Jul. 6, 2009 issued in AU 2007200982.
Australian Withdrawal of Opposition by Aristocrat Technologies dated Aug. 12, 2009 issued in AU 2007200982.
PCT International Search Report and Written Opinion dated May 9, 2008 issued in for WO 2008/048857.
PCT Written Opinion dated May 9, 2008 issued in WO 2008/048857.
PCT International Preliminary Report on Patentability and Written Opinion dated Apr. 15, 2009 issued in WO2008/048857.
Australian Examiner's first report dated Nov. 30, 2011 issued in AU2007312986.
Australian Patent Examination Report No. 2 dated Oct. 16, 2012 issued in AU2007312986.
European Examination Report dated Sep. 10, 2009 issued in EP 07 853 965.7.
PCT International Search Report dated May 20, 2008 issued in WO2008/063969.
PCT Written Opinion dated May 20, 2008 issued in WO 2008/063969.
PCT International Preliminary Report on Patentability and Written Opinion dated May 19, 2009 issued in WO 2008/063969.
Australian Examiner's first report dated Aug. 19, 2011 issued in AU2007323962.
Australian Examiner's report No. 2 dated Feb. 24, 2012 issued in AU2007323962.
PCT International Search Report dated Jul. 21, 2008 issued in WO 2008/063968.
PCT Written Opinion dated Jul. 21, 2008 issued in WO 2008/063968.
PCT International Preliminary Report on Patentability and Written Opinion dated May 19, 2009 issued in WO 2008/063968.

Australian Examiner's first report dated Jul. 29, 2011 issued in AU 2007323961.
European Examination Report dated Oct. 28, 2009 issued in EP 07 854 617.3.
PCT International Search Report dated Jun. 15, 2004 issued in WO 2004/07974.
PCT International Preliminary Report on Patentability and Written Opinion dated Sep. 2, 2005 issued in WO 2004/07974.
Australian Examiner's First Report dated May 17, 2007 issued in AU 2004216952.
Australian Examiner's Report No. 2 dated Jul. 30, 2007 issued in AU 2004216952.
Australian Examiner's Report No. 3 dated May 28, 2008 issued in AU 2004216952.
Japanese Description of Office Action dated Jul. 4, 2006 issued in Application No. 2005-518567.
Japanese Description of Office Action Final dated Apr. 10, 2007 issued in Application No. 2005-518567.
Japanese Description of Office Action (interrogation) dated May 25, 2009 issued by an Appeal Board in Application No. 2005-518567.
European Extended Search Report dated Jan. 26, 2012 issued in EP 11 176 202.7.
European Communication dated Mar. 5, 2012 issued in EP 11 176 202.7.
European Communication dated Oct. 15, 2012 issued in EP 11 176 202.7.
GB Combined Search and Examination Report dated Nov. 18, 2011 issued in GB1113207.3.
Singapore Search Report and Written Opinion dated Sep. 26, 2012 issued in SG Application No. 201105570-4.
Australian Examiner's First Report dated Apr. 5, 2005 issued in AU2003227286.
Australian Examination Report (as described by Applicant's Attorney) dated Feb. 26, 2009 issued in AU2003227286.
Australian Re-Examination Report dated May 1, 2009 issued in AU2003227286.
Australian Examiner Communication regarding Claims dated Nov. 24, 2009 issued in AU2003227286.
Australian Notice of Acceptance with Exam Comments dated Jan. 28, 2010 issued in AU2003227286.
Australian Examiner's First Report dated Jul. 23, 2007 issued in AU2006203570.
Australian Notice of Acceptance with Examiner's Comments dated Nov. 15, 2007 issued in AU2006202570.
Australian Re-Examination Report (No. 1) dated Dec. 2, 2009 issued in AU2006203570.
Australian Examiner Communication dated Feb. 5, 2010 issued in AU 2006203570.
Australian Re-Examination Report (No. 2) dated Feb. 8, 2010 issued in AU 2006203570.
Bonsor, Kevin (2002), "How Smart Windows Will Work," *Howstuffworks, Inc.* 1998-2002, [retrieved from the Internet on Nov. 25, 2002] at http://www/howstuffworks.com/smart-window.htm/ printable, 5 pgs.
Bonser, Kevin (2004) "How Smart Windows Work," *HowStuffWorks, Inc.*, 1998-2004, retrieved from the Internet on Apr. 1, 2004 at http:// www.howstuffworks.com, 9 pgs.
Debut of the Let's Make a Deal Slot Machine (2002), *The Official Let's Make a Deal* Website at www.letsmakeadeal.com, 1999-2002, modified Jan. 2, 2002; downloaded from Internet on Dec. 3, 2002 at http:///www.letsmakeadeal.com/pr01.htm, 2 pp.
Light Valve (2005), www.meko.co.uk, [retrieved from the Internet on Nov. 15, 2005] at http://www.meko.co.uk/lightvalve.shtml, 1 page.
Liquid Crystal Display (2005), Wikipedia.org, [retrieved from the Internet on Nov. 16, 2005] at http://en.wikipedia.org/wiki/LCD, 6 pp.
"Living in a flat world?" Deep Video Imaging Ltd. Marketing Brochure, published in 2000 (full date unknown), 8 pp.
Newton, Harry, Newton's Telecom Dictionary, Jan. 1998, Telecom Books and Flatiron Publishing, p. 399.
Novel 3-D Video Display Technology Developed, News release on Aug. 30, 1996; [Retrieved from Internet at http://www.eurekalert.org/ summaries/1199.html (archive) on Sep. 2, 2000; Feb. 14, 2003], 2 page.
"Pointer_Ballistics for Windows XP.pdf" (Oct. 31, 2002), *Microsoft*, [downloaded on Aug. 27, 2010 from http://www.microsoft.com/ whdc/archive/pointer-bal.mspx], 3 pages.
Police 911, *Wikipedia*, Jan. 22, 2002, retrieved from Internet at http:// en.wilkipedia.org/widi/Police_911 on Oct. 28, 2007, 4 pp.
Saxe et al. (1996) "Suspended-Particle Devices," Refr-spd.com, retrieved from the Internet on Apr. 1, 2004 at http://www.refr-spd.com, vol. Information Display Apr./May 1996, 5 pp.
SPD (1999), *Malvino Inc.*, retrieved from the Internet on Jul. 19, 1999 at http://www.malvino.com, 10 pgs.
Stic Search History, Patent Literature Bibliographic Databases, in a US Office Action dated Jul. 23, 2010 issued in U.S. Appl. No. 11/938,15, 98 pages.
Time Multiplexed Optical Shutter (TMOS): A revolutionary Flat Screen Display Technology, www.tralas.com/TMOS.html, Apr. 5, 2001, printed from Internet Archive using date Apr. 11, 2001; 5 pgs.
Time Multiplexed Optical Shutter (TMOS): A revolutionary Flat Screen Display Technology, www.vea.com/TMOS.html, Apr. 8, 1999, printed from Internet Archive using date Oct. 6, 1999; 6 pgs.
What is SPD? (2002), www.SPD Systems, Inc., [retrieved from the Internet on Dec. 4, 2002] at http://www.spd-systems.com/spdq.htm, 2 pgs.

* cited by examiner

METHODS AND SYSTEMS FOR IMPROVING PLAY OF A BONUS GAME ON A GAMING MACHINE AND IMPROVING SECURITY WITHIN A GAMING ESTABLISHMENT

FIELD OF THE INVENTION

The present disclosure generally relates to security procedures and bonus games, and more particularly to systems and methods for improving play of a bonus game on a gaming machine and improving security in a gaming establishment.

BACKGROUND

There are many types of establishments in which gaming machines may be located. For example, a gaming machine may be located in a casino, an airport, a store, a restaurant, or a bar. Such establishments typically have a significant amount of property, such as gaming machines, cash, gaming chips, furniture, and electronic equipment.

A thief may enter a gaming establishment and remove such property without being caught especially in a large establishment in which a great number of people are present. The size of the establishment and the number of people present in the establishment may improve a thief's chances of escaping from the establishment.

Further, some jurisdictions may require that people within a gaming establishment be able to see important designations, such as an 'Exit' sign to exit the gaming establishment, especially during an emergency, such as fire within the gaming establishment or other calamity.

Accordingly, there is a need for a gaming establishment to protect its property and to improve the visibility of important designations.

Additionally, one popular game that has long been enjoyed by many players is a slot machine game. Conventionally, a slot machine is configured for a player to input something of value, such as, for example, a standard denomination of currency, a ticket, a house token, or other representation of currency or credit, and then to permit the player to cause a plurality of reels to spin and ultimately stop to display a random combination of some form of indicia, for example, numbers or symbols. If this display contains one of a preselected plurality of winning combinations, the machine releases value, for example, into a payout chute or onto a credit meter.

Those familiar with games involving winning payouts, such as the popular television game show entitled "WHEEL OF FORTUNE™", will realize that as players and observers watch a large wheel spin and gradually come to rest, the players experience a heightened feeling of anticipation and excitement as the wheel is slowing down to indicate a possible prize. The Wheel of Fortune™ game may also be played at a gaming machine. However, it is desirable to make the Wheel of Fortune® game more exciting and interesting for a player to play at a gaming machine.

SUMMARY OF THE INVENTION

Methods and systems for improving play of a bonus game on a gaming machine and improving security within a gaming establishment are described.

In one aspect, the invention features a gaming machine. The gaming machine includes an input device that receives an input from a user, a first display device that displays a primary game upon receiving the input, and a second display device that includes a multilayer display for displaying a secondary game. The multilayer display includes a foreground screen and a background screen. At least a portion of one of the foreground screen and the background screen is curved and one of the foreground screen and the background screen is configured to display an image of a wheel. The gaming machine further includes a controller that executes the primary and secondary games, wherein the secondary game is played after playing the primary game.

Yet another aspect of the invention features a gaming system. The gaming system includes a foreground screen that displays a foreground image and a background screen that displays a background image. A portion of at least one of the foreground screen and the background screen is curved. The foreground image or the background image includes an image of a wheel. The gaming system further includes a controller that controls the display of the foreground image and the background image after play of a primary game.

In certain implementations of the gaming machine and the gaming system, the secondary game is initiated based on an outcome of the primary game. Also, the primary game may be initiated upon receiving a first wager from the user and the secondary game is initiated upon receiving a second wager from the user. Further, the foreground screen may have a circular or tombstone shape. Furthermore, the background screen of the gaming machine may also have a circular shape or tombstone shape.

Various implementations of the gaming machine and the gaming system further include a light barrier that prevents light from illuminating the background screen or a portion of the foreground screen. The light barrier may extend between the foreground screen and the background screen.

Some implementations of the gaming machine include a secondary game initiation button, wherein the secondary game initiation button is other than the input device. Further, the background screen may display an image of the wheel including a plurality of segments and the controller may change a number of credits or a description of a prize within at least one of the segments. Also, the foreground screen may display an image of the wheel and the background screen may display an image of a set of graphical elements including at least one of a pointer and a bonus multiplier.

In other implementations of the gaming machine, the foreground screen displays an image of a set of graphical elements including at least one of a pointer and a bonus multiplier and the background screen displays an image of the wheel. The background screen may be smaller than the foreground screen. More specifically, the background screen may have a smaller diameter than the foreground screen.

In still other implementations, the foreground screen includes a liquid crystal display (LCD) device or a light emitting diode (LED) display device, and the background screen includes an LCD device or a light emitting diode (LED) display device.

Also, the multilayer display may include a light source that illuminates the background screen.

The foreground screen and the background screen may each include a set of pixels, and an interstitial layer may be disposed between the foreground screen and the background screen to reduce interference between the set of pixels of the background screen and foreground screen.

Some implementations of the gaming machine include a light barrier that prevents light from illuminating the background screen or a portion of the foreground screen, and includes a light source that surrounds the background screen. The background screen may be smaller in diameter than a diameter of the foreground screen.

The light barrier may be located between the light source and the background screen and between the light source and the foreground screen to prevent light from illuminating the background screen or an inner portion of the foreground screen.

The light source may be a ring-shaped light source.

A portion of the light barrier is concentric with a portion of the background screen and the foreground screen.

In some implementations of the gaming system, the foreground screen has a shape of the foreground image displayed within the foreground screen, and the background screen has a shape of the background image displayed within the background screen.

In another aspect, the invention features a gaming method. The gaming method includes receiving, via an input device, an input; displaying, via a first display device, a primary game upon receiving the input; and displaying, via a second display device including a multilayer display having a foreground screen and a background screen, a secondary game including an image of a wheel. A portion of at least one of the foreground screen and the background screen is curved. The gaming method further includes executing, by a controller, at least one of the primary game and the secondary game. The secondary game is played after the primary game.

Various implementations of the gaming method further include preventing light from illuminating the background screen or a portion of the foreground screen; and initiating the secondary game based on an outcome of the primary game. Additionally, the primary game may be initiated upon receiving a first wager from the user and the secondary game initiated upon receiving a second wager from the user.

Some implementations of the gaming method include initiating the secondary game upon receiving an indication that a secondary game initiation button other than the input device of a gaming machine is activated. The foreground screen may have a shape of a foreground image displayed within the foreground screen, and the background screen may have a shape of a background image displayed within the background screen.

Still a further aspect of the invention features another gaming method. The gaming method includes displaying, via a foreground screen, a foreground image and displaying, via a background screen, a background image. A portion of at least one of the foreground screen and the background screen is curved. The foreground image or the background image includes an image of a wheel. The gaming method further includes displaying an image of a primary game on a screen other than the background screen or the foreground screen, and displaying the foreground image and the background image if a winning outcome is achieved by playing the primary game.

In certain implementations, the foreground image and background image include images of a secondary game. The secondary game may be initiated based on an outcome of the primary game.

BRIEF DESCRIPTION OF THE DRAWINGS

The systems and methods for improving play of a bonus game on a gaming machine and improving security within a gaming establishment may best be understood by reference to the following description taken in conjunction with the accompanying drawings, which illustrate specific embodiments of the systems and methods.

DETAILED DESCRIPTION

Figure 1:
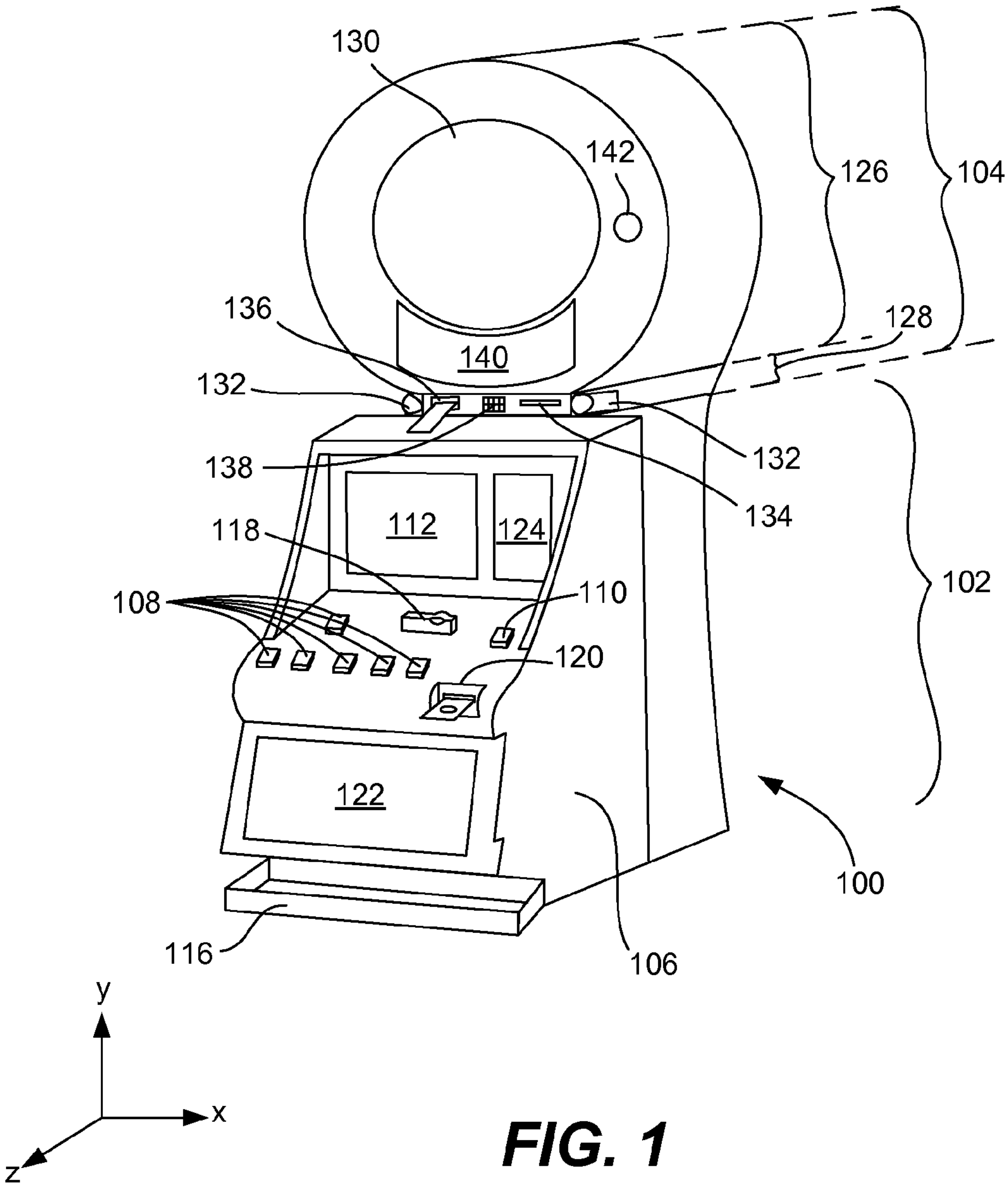
FIG. 1 is a schematic view of an embodiment of a gaming machine.

Turning to the drawings, wherein like reference numerals refer to like elements, the systems and methods for improving play of a bonus game and security within a gaming establishment are illustrated as being implemented in a suitable gaming machine.

With reference to FIG. 1, a gaming machine 100 includes a main cabinet 102 and a top box 104. Main cabinet 102 includes a main door 106, a plurality of input/output (I/O) buttons 108, a secondary game initiation button 110, a primary display device 112, a coin tray 116, a coin acceptor 118, a bill or ticket validator 120, a belly glass display 122, and a silk screen panel 124. Top box 104 includes a circular portion 126 and a noncircular portion 128. For example, circular portion 126 has a partially circular x-y cross-section, and noncircular portion 128 has a partially straight x-y cross-section. The x-y cross-section is formed along an x-y plane as illustrated, and the x-y plane is perpendicular to the z-axis. Top box 104, which rests on top of main cabinet 102, includes a secondary display device 130, a plurality of speakers 132, a card reader 134, a ticket printer 136, a keypad 138, a silk screen panel 140, and a camera 142.

Primary display device 112 may be a cathode ray tube (CRT) display or a flat panel display device, such as a liquid crystal display (LCD) device or a light emitting diode (LED) display device. The LED display device may be an organic LED (OLED) display device.

In certain embodiments, primary display device 112 includes a multilayer display (MLD) described, for example, in U.S. Patent Application Publication No. 2008/0113745A1 titled "Separable Game Graphics On a Gaming Machine" having Ser. No. 11/858,693, which is incorporated herein by reference in its entirety for all purposes.

Secondary display device 130 may be an MLD device including layered displays. Secondary display device 130 has a curved shape, such as a circular shape. Secondary display device 130 may be of the same shape as that of circular portion 126 of top box 104. For example, secondary display device 130 may have a circular x-y cross-section. An x-y cross-section of secondary display device 130 may or may not be concentric with an x-y cross-section of circular portion 126 of top box 104.

In an alternative embodiment, secondary display device 130 may have an oval shape, an 'S' shape, or a 'T' shape. The secondary display device 130 may also have a different shape than that of circular portion 126 of top box 104.

Figure 2:
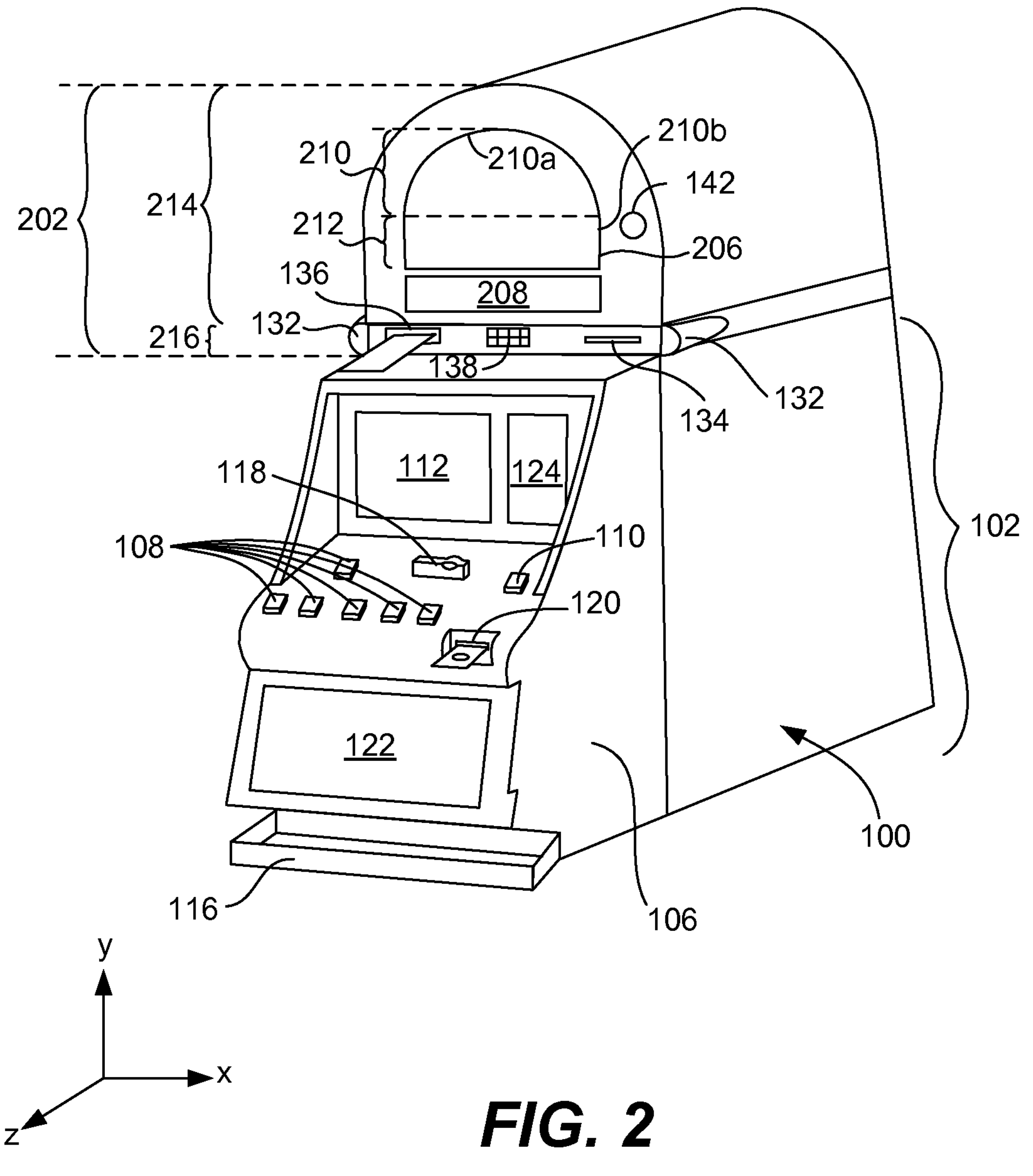
FIG. 2 is a schematic view of another embodiment of a gaming machine.

Referring to FIG. 2, a gaming machine 200 includes a top box 202 and main cabinet 102 (FIG. 1). Top box 202 rests on top of main cabinet 102. Top box 202 includes a secondary display device 206, keypad 138, a silk screen panel 208, card reader 134, speakers 132, and ticket printer 136. Secondary display device 206 has a tombstone shape, which includes a partially curved portion 210 and a straight portion 212. For example, partially curved portion 210 has at least one side 210*a* that has a curved x-y cross-section and at least one side 210*b* that has a straight x-y cross-section. Partially curved portion 210 is adjacent to straight portion 212. Straight portion 212 may have a rectangular or square x-y cross-section. The partially curved portion 210 may have a semi-circular or semi-elliptical cross-section. Secondary display device 206 may have the same shape as that of top box 202. For example, secondary display device 206 has the same cross-sectional shape as that of top box 202.

Top box 202 includes a partially curved portion 214 and a straight portion 216. Partially curved portion 214 of top box 202 may be semi-circular or semi-elliptical in shape. For example, partially curved portion 214 of top box 202 has the same shape as that of partially curved portion 210 of secondary display device 206. Also, straight portion 216 of top box 202 has the same shape as that of straight portion 212 of secondary display device 206.

Alternatively, secondary display device 206 has a different shape than that of top box 202. Top box 202 also does not necessarily need to include silk screen panel 208.

Figure 3:
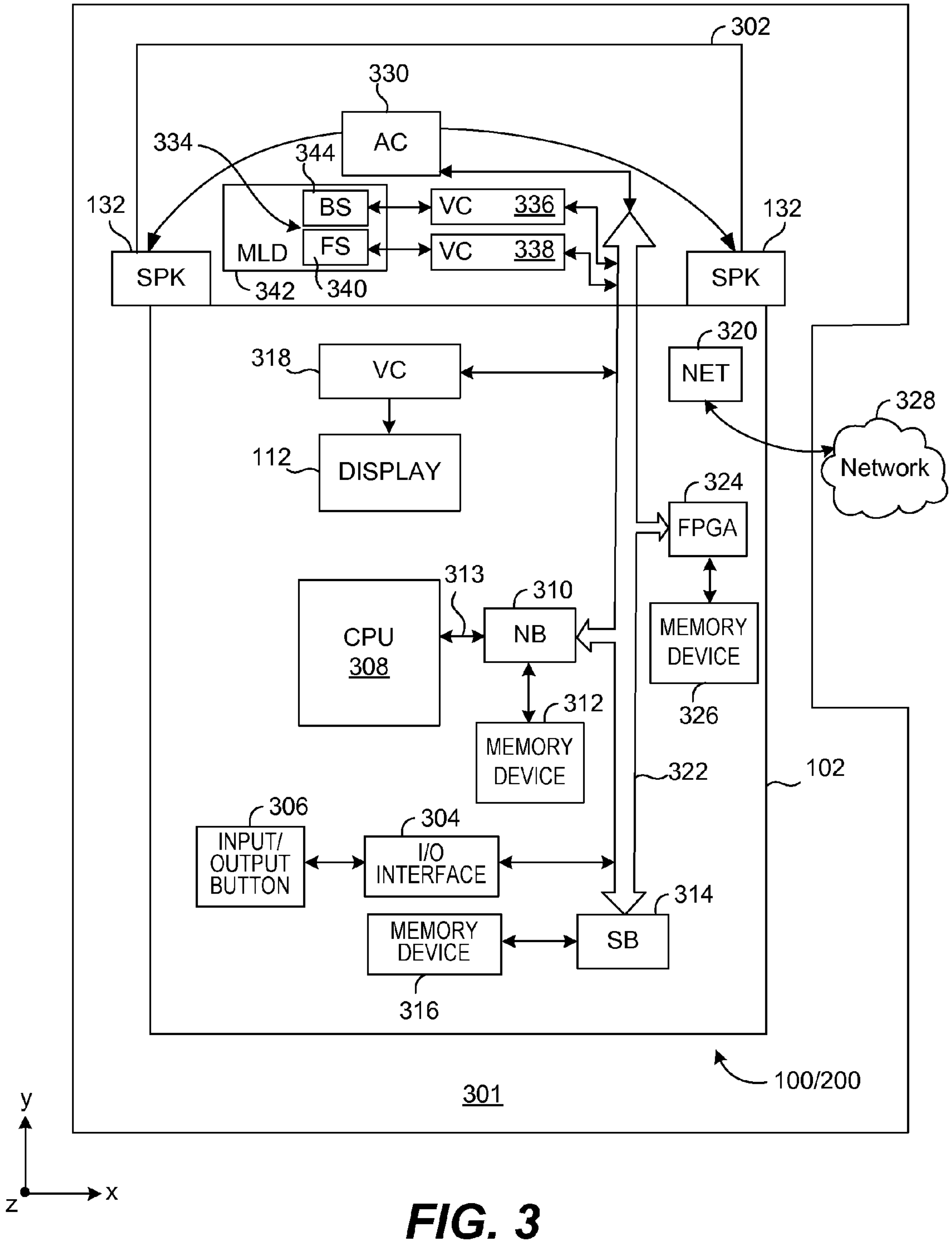
FIG. 3 is a block diagram of the electronics of the gaming machines of FIGS. 1 and 2.

Referring to FIG. 3, gaming machine 100 or 200 is located within a gaming establishment 301, for example, a casino or other location such as an airport, a convenience store, a restaurant, a bar, or a hotel. Gaming machine 100 or 200 includes main cabinet 102 and a top box 302. Top box 104 (FIG. 1) is an example of one type of top box and top box 202 (FIG. 2) is an example of another type of top box.

Main cabinet 102 includes an input/output (I/O) interface 304, an input/output button 306, a central processing unit (CPU) 308, a north bridge (NB) 310, a first memory device 312, a south bridge (SB) 314, a second memory device 316, a primary video controller (VC) 318, primary display device 112, a network (NET) interface 320, a bus 322, a field programmable gate array (FPGA) 324, and a third memory device 326. As used herein, the term controller refers to a combination of a processor and a memory device, such as a random access memory (RAM) or a read-only memory (ROM). Moreover, as used herein, the term processor is not limited to just those integrated circuits referred to in the art as a processor, but broadly refers to a microcontroller, a microcomputer, a programmable logic controller, an application specific integrated circuit, and other programmable circuits.

Primary video controller 318 may be a video adapter, a video card, a display adapter, or a graphics accelerator card.

Input/output button 306 is any of input/output buttons 108 (FIGS. 1 and 2) or secondary game initiation button 110 (FIGS. 1 and 2). Each of input/output button 306, keypad 138, bill or ticket validator 120, card reader 134, and coin acceptor 118 of gaming machine 100/200 is an example of an input/output device. Further examples of an input/output device include a touchscreen of primary display device 112.

Network interface 320 includes a network interface card (NIC) or a modem that connects gaming machine 100/200 to a network 328, such as a wide area network or a local area network. The wide area network may be the Internet and the local area network may be an Intranet. Network 328 may be connected to a general purpose server or a specific purpose server, such as a progressive game server or a player tracking server. Network interface 320 may also connect gaming machine 100/200 to a plurality of gaming machines that may be located within or outside gaming establishment 301.

CPU 308 may be a processor of a master gaming controller (MGC) of gaming machine 100/200. As an example, CPU 308 is a Pentium™ series processor available from Intel™ corporation, or it may be a K6™ series processor available from Advanced Micro Devices™ (AMD™) corporation. First memory device 312 connected to north bridge 310 may be a RAM, such as, a dynamic RAM (DRAM) or a static RAM (SRAM).

Second memory device 316 connected to south bridge 314 may be a hard disk, a compact disc (CD), or a ROM, such as an Electrically Erasable Programmable ROM (EEPROM) or an Erasable Programmable ROM (EPROM). Third memory device 326 connected to FPGA 324 may be a RAM, such as a nonvolatile RAM, or a ROM, such as an EPROM or an EEPROM, or a combination of the ROM and RAM. Bus 322 may be a peripheral controller interface (PCI) bus. Second memory device 316 may store a basic input/output operating system (BIOS), and third memory device 326 connected to FPGA 324 may store an extended BIOS.

Second memory device 316 may also store a primary game code used to play a primary game, which may be a video game, such as a slot machine game, a Bingo game, a Keno game, a Poker game, a Blackjack game, or a combination of such games. The primary game may be a game of chance, a game of skill, or a combination of the games of chance and skill. Moreover, second memory device 316 may store a secondary game code used to play a secondary game, which may be a video game, for example a wheel-based game, a tic-tac-toe game, or a movie-based theme game, such as a Star Trek™ game or an Indiana Jones™ game. The wheel-based game may be the Wheel of Fortune® game. The term wheel, as used herein, is not necessarily a circular wheel but rather can be a polygonal wheel or a combination of a polygonal wheel and a curved wheel. The combination of the polygonal wheel and the curved wheel may be a tombstone-shaped wheel. The secondary game may be a game of chance, a game of skill, or a combination of the games of chance and skill.

During a boot-up process of gaming machine 100/200, CPU 308 executes the BIOS stored in second memory device 316. Logic of the BIOS directs CPU 308 towards the extended BIOS. Both the BIOS and extended BIOS include a variety of processes, such as booting of gaming machine 100/200, configuration of gaming machine 100/200, and/or authentication of various components of gaming machine 100/200. The extended BIOS directs CPU 308 to command primary display device 112 to display an advertisement, such as a preview of the primary game or a description of a product or service, on primary display device 112. The extended BIOS may direct CPU 308 to transfer the primary and/or secondary game code from second memory device 316 to first memory device 312 connected to north bridge 310. North bridge 310 may be an FPGA or an Application Specific Integrated Circuit (ASIC). North bridge 310 converts a signal on the PCI bus to a signal compatible with a CPU bus 313 between CPU 308 and north bridge 310.

South bridge 314 may contain various internal components, such as a hard drive controller (not shown), and can be used to connect second memory device 316 to CPU 308. If second memory device 316 is a hard drive or a CD-ROM, second memory device 316 can connect to south bridge 314 via an integrated drive electronics (IDE) bus or other similar connection. A typical IDE bus operates at a speed of about 100 megahertz (MHz), which is generally appropriate for the access rates of many hard drives and CD-ROM drives. If second memory device 316 is an EPROM, second memory device 316 can connect to south bridge 314 via a basic industry standard architecture ("ISA") bus, which can be relatively slow compared to other buses and connections. For example, a typical IDA bus might transmit data at a speed of about 8 MHz, which would be appropriate for an EPROM and other similarly slower memory devices.

Top box 302 includes an audio controller (AC) 330, an interstitial layer 334, a secondary video controller (VC) 336, another secondary video controller (VC) 338, a secondary display device 340, and speakers 132. An exemplary interstitial layer includes a holographic film on a substrate. The secondary display device 340, as noted, may be an MLD. As such, it includes a foreground screen (FS) 342 connected to secondary video controller 338 and a background screen (BS) 344 connected to secondary video controller 336. Interstitial layer 334 lies between foreground screen 342 and background screen 344 to remove Moiré interference pattern between the two screens. Each secondary display device 130 and 206 (FIGS. 1 and 2) is an example of secondary display device 340. Each secondary video controller 336 and 338 may be a video adapter, a scalar/image card, a video card, a display adapter, or a graphics accelerator card. Audio controller 330 includes a sound synthesizer and/or a sound amplifier. Audio controller 330 sends audio signals to speakers 132 to output sounds during play of an advertisement, a primary game, and/or a secondary game.

Gaming machine 100/200 may display an advertisement to a user, such as a player or patron of gaming establishment 301. The user provides an input to gaming machine 100/200 via the input/output devices. For example, the user inputs a coin in coin acceptor 118; a bill or a ticket in bill or ticket validator 120; or a value card, such as a credit card, a debit card, or a player tracking card, in card reader 134. The user may select any of input/output buttons 108, a button displayed on the touchscreen of primary display device 112, or a button on keypad 138 to provide input to gaming machine 100/200. Upon receiving an input signal representing the input provided by the user via an input/output device, CPU 308 instructs primary video controller 318 to discontinue displaying the advertisement on primary display device 112 and determines whether to execute the primary game code. For example, after discontinuing to display the advertisement and upon receiving a signal indicating that a bet or a side bet is placed by the user via one of input/output buttons 108 or a touchscreen of primary display device 112, CPU 308 executes the primary game code. As another example, after discontinuing to display the advertisement and upon receiving a signal that the user has selected a cash out button or has not made the bet or side bet, CPU 308 does not execute the primary game code and allows primary video controller 318 to resume displaying the advertisement.

A bet may also be referred to as a wager. As an example, a bet is equal to a value multiplied by a denomination of the primary game. Each of coin acceptor 118, bill or ticket validator 120, and card reader 134 is a type of a value input device.

If a value from a user is not received via one or more of the value input devices within a certain amount of time after discontinuing to display the advertisement, CPU 308 will not execute the primary game code and allows primary video controller 318 to resume displaying the advertisement.

Upon executing the primary game code, CPU 308 may receive additional input from the user via an input device and then execute a random number generator to generate a primary game outcome at an end of the primary game. The primary game outcome is displayed on primary display device 112. Examples of the primary game outcome include a reel combination of three '7's, any other reel combination in a slot machine game, a Blackjack hand, another hand in a Blackjack game, or a match or a mismatch between drawn numbers and numbers on a Bingo card in a Bingo game.

CPU 308 determines whether the primary game outcome is a winning outcome. Examples of a winning outcome of the primary game include a winning Blackjack hand or a combination of three '7's in a slot machine game. Examples of a losing outcome of the primary game include a dealer having a Blackjack hand rather than the user and a combination of a fruit symbol, a '7', and a vegetable symbol in a slot machine game. Upon determining that the primary game outcome is not a winning outcome, CPU 308 causes primary video controller 318 to generate a display that the primary game is over or a display that additional value is required to continue playing the primary game. On the other hand, upon determining that the primary game outcome is a winning outcome, CPU 308 maps the primary game outcome to a number of primary game credits to be awarded to the user. At any time during the play of the primary game or during a display of an advertisement, CPU 308 controls primary video controller 318 such that the primary game credits are displayed on primary display device 112, and controls audio controller 330 such that sounds are outputted via speakers 132 during play of the primary game. Silk screen panel 124 may display a map between the primary game outcome and a number of the primary game credits that may be awarded to the user when the primary game outcome is a winning outcome.

Upon determining that the primary game outcome is not a winning outcome, CPU 308 may cause primary video controller 318 to generate a display that the primary game is over or a display which prompts the user to select one of input/output buttons 108 to continue playing the primary game.

Upon determining that the primary game outcome is a winning outcome, CPU 308 awards a primary game value that is equal to a number of the primary game credits divided by a game denomination used to play the primary game. The award may be in the form of coins dispensed via a coin tray 116, a ticket printed by ticket printer 136, or a credit added to a value card read by card reader 134. Coin tray 116, ticket printer 136, and the value card are examples of a value output device. At any time during the play of the primary game, the user may press a cash out button, which is one of the input/output buttons 108, to end the play of the primary game and cash out a value corresponding to any remaining credits available for game play. Upon determining that the primary game outcome is a winning outcome, the value may or may not be awarded to the user at the end of the primary game, before enrolling the user in the secondary game. The secondary game is normally initiated after enrolling the user in the secondary game.

Further, upon determining that the primary game outcome is a winning outcome, CPU 308 may permit a user to play a secondary game by executing the secondary game code to control secondary video controllers 336 and 338 to display the secondary game on secondary display device 340. CPU 308 receives, from the user, various inputs via one or more of input/output buttons 108, the touchscreen of primary display device 112, or a touchscreen of secondary display device 340. The CPU 308 also executes a random number generator based on the input to generate a secondary game outcome at an end of the secondary game; controls, as noted, secondary video controllers 336 and 338 to display the secondary game outcome on secondary display device 340; and controls audio controller 330 to output sounds, such as the clapper hitting the peg, via speakers 132 during play of the secondary game.

The secondary game is of a different type than that of the primary game. For example, the secondary game may be a wheel-based game, a tic-tac-toe game, or a movie-based theme game.

CPU 308 determines whether a game outcome of the secondary game is a winning outcome. Examples of a winning outcome of the secondary game include a pointer, described below, pointing to a number of credits greater than zero or to a prize, described below. Examples of a losing outcome of the secondary game include a bonus multiplier, described below, of zero and/or the pointer pointing to a blank segment, described below, without any credits in a wheel, such as a wheel of the Wheel of Fortune™ game. Upon determining that the secondary game outcome is a losing outcome, CPU 308 does not provide an award, via a value output device to a user, other than any value determined to be awarded to the user for achieving a winning outcome of the primary game. On the other hand, upon determining that the secondary game outcome is a winning outcome, CPU 308 controls a value output device to output a value to the user. That value is equal to a total amount of value output for achieving a winning outcome of the secondary game and a winning outcome of the primary game. The value output to the user for achieving a winning outcome of the secondary game may be less than, equal to, or greater than the value output to the user for achieving a winning outcome of the primary game.

In another embodiment, gaming machine 100/200 does not include coin tray 116, coin acceptor 118, card reader 134, ticket printer 136, and/or bill or ticket validator 120, as this gaming machine is a non-wagering machine. For example, in this embodiment, value is not input into or output from the gaming machine. In yet another embodiment, gaming machine 100/200 does not include secondary game initiation button 110.

In other embodiments, the processes, described herein, as performed by secondary video controllers 336 and 338 are performed by a single secondary video controller or by more than two secondary video controllers.

In another embodiment, upon determining that a winning outcome is achieved by playing the primary game, CPU 308 controls primary video controller 318 to prompt the user to select a button on the touchscreen of primary display device 112 to start the secondary game. A light of secondary game initiation button 110 is also turned on to prompt the user to press the secondary game initiation button 110 to initiate execution of the secondary game, and/or to prompt the user to pull a lever (not shown) of gaming machine 100/200. Upon determining that a button displayed on the touchscreen of primary display device 112 is selected by a user, CPU 308 determines to enroll the user in an occurrence of the secondary game and executes the secondary game code. Moreover, upon determining that the secondary game initiation button 110 is pressed by the user, or the lever is pulled by the user, CPU 308 determines to enroll the user in an occurrence of the secondary game and executes the secondary game code. Further, upon determining that the lever is pulled by the user, CPU 308 determines to enroll the user in an occurrence of the secondary game and executes the secondary game code.

In still another embodiment, upon determining that the primary game outcome is a winning outcome, CPU 308 causes primary video controller 318 or secondary video controllers 336 and 338 to generate a display that indicates that additional value, other than the value provided by the user to play the primary game, is required to play the secondary game. Upon determining that the additional value is received from the user via a value input device, CPU 308 executes the secondary game code to control secondary video controllers 336 and 338 and controls audio controller 330 to output sounds, such as a clapper hitting a peg of a wheel, during play of the secondary game. On the other hand, upon determining that the additional value to play the secondary game is not received from the user, CPU 308 does not execute the secondary game code.

In another embodiment, CPU 308 ignores all input received from the user during the play of the secondary game. For example, upon determining that the primary game outcome is a winning outcome, CPU 308 executes the secondary game by spinning a wheel, shown below, and ignores any input, such as a selection of input/output buttons 108 (FIGS. 1 and 2). The CPU 308 also generates the secondary game outcome, executes a random number generator to generate the secondary game outcome, and controls secondary video controllers 336 and 338 to display the secondary game. The CPU 308 controls audio controller 330 to output sounds during play of the secondary game.

In a further alternative embodiment, the secondary game may be of the same type as that of the primary game. For example, both the primary and secondary games may be Bingo. In this example, CPU 308 controls secondary video controllers 336 and 338 to display a Bingo card on secondary display device 340 to play the secondary Bingo game, upon the user achieving a winning outcome on a Bingo card used in the primary Bingo game. In yet another embodiment, instead of awarding value upon achieving a winning outcome of the primary game and/or the secondary game, CPU 308 awards the user with an award other than the value, such as a chance to play the primary and/or secondary game again upon achieving the winning outcome.

In a further alternative embodiment, the primary game code and/or the secondary game code is located on a remote server, which is connected via network 328 to gaming machine 100/200. The primary game code and/or the secondary game code is executed by the remote server to display the corresponding primary and/or secondary game on gaming machine 100/200.

Figure 4:
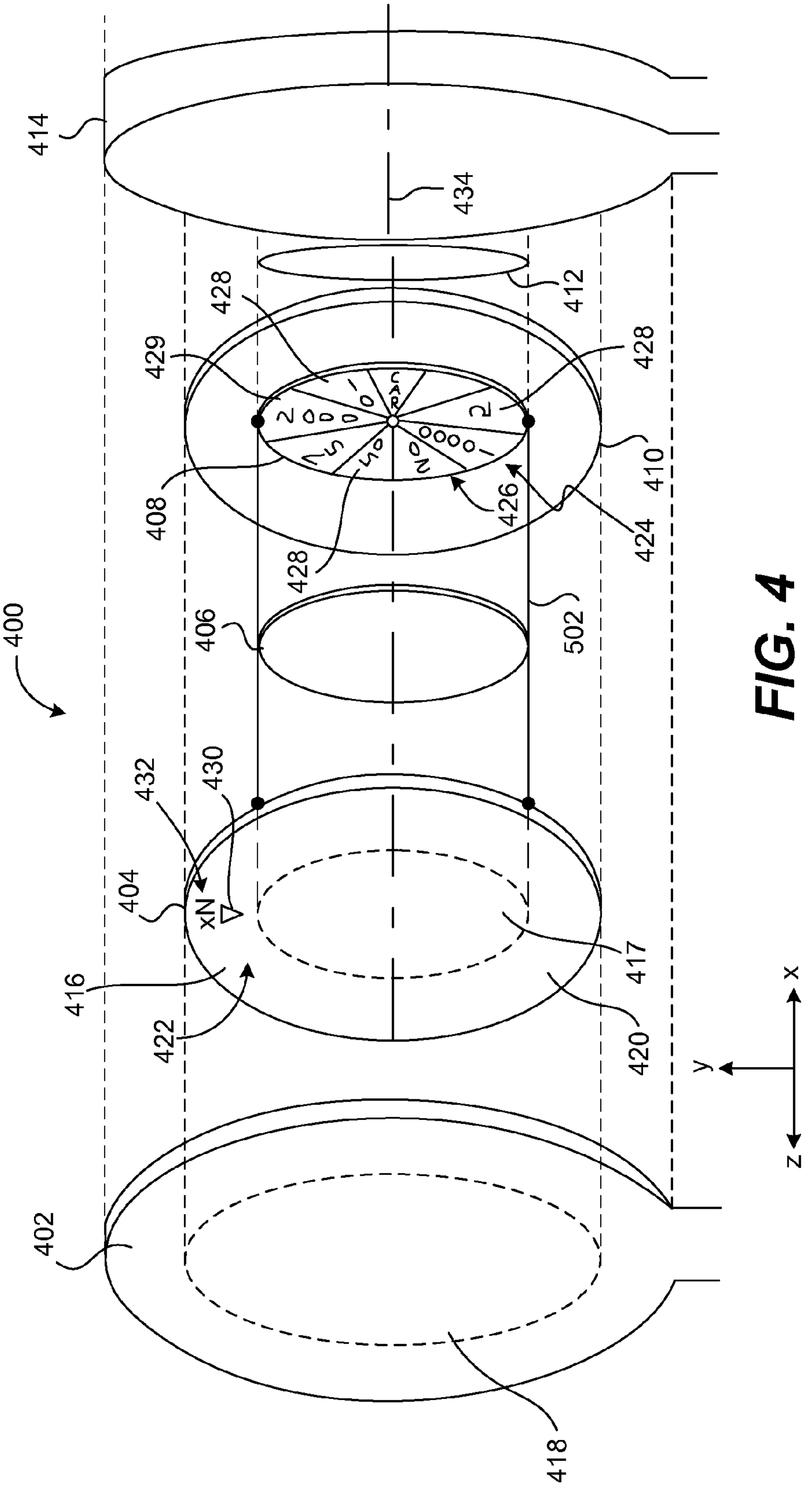
FIG. 4 is a schematic view of an embodiment of a system for playing a secondary game on the gaming machine of FIG. 3.

FIG. 4 illustrates a system 400 for playing the secondary game. System 400 includes a front cover 402 of top box 104 (FIG. 1), a foreground screen 404, an interstitial layer 406, a background screen 408, a ring-shaped light source 410, a light barrier 502, a light source 412, and a back cover 414 of top box 104. Interstitial layer 406 is an example of interstitial layer 334 (FIG. 3). Foreground screen 404 is an example of foreground screen 342 (FIG. 3), and background screen 408 is an example of background screen 344 (FIG. 3).

Foreground screen 404, interstitial layer 406, background screen 408, ring-shaped light source 410, and light source 412 are located inside top box 104 (FIG. 3). A front surface 416, which is a surface on which a foreground image 422 is displayed, of foreground screen 404 is visible to the user via an opening 418 in front cover 402. Foreground screen 404 may be an LCD display device or an LED display device, such as an OLED display device. Background screen 408 may be an LCD display device or an LED display device, such as an OLED display device. Light source 412 may be an LED light source that emits colored light or a cold cathode fluorescent light (CCFL) source that emits white light. As an example, colored light, as described herein, is red, green, or blue light, or a combination of red, green, and blue light. As another example, colored light, as described herein, is red, green, blue, or yellow light, or a combination of red, green, blue, and yellow light. Light source 412 may or may not be of the same shape as that of background screen 408. For example, light source 412 may be circular or have a circular x-y cross-section. As another example, light source 412 may be rectangular or square in shape. For example, light source 412 may have a rectangular or square shaped x-y cross-section.

Ring-shaped light source 410 surrounds background screen 408, and an x-y cross-section of the ring-shaped light source is concentric with an x-y cross-section of background screen 408. Ring-shaped light source 410 is located in the same x-y plane as background screen 408. Ring-shaped light source 410 includes at least one light source that emits white light or colored light. For example, ring-shaped light source 410 may include a plurality of LEDs, such as a red, blue, and green (RGB) LED array.

Foreground screen 404, in one embodiment, has the same circular shape as background screen 408. It is also larger in diameter than background screen 408.

Interstitial layer 406 is placed between foreground screen 404 and background screen 408. Without interstitial layer 406, a Moiré interference pattern is created by the pixel patterns of foreground screen 404 and background screen 408. Interstitial layer 406 slightly diffuses the pixel pattern of background screen 408 to remove the interference pattern. Interstitial layer 406 may have the same diameter and shape as light barrier 502.

Light barrier 502 is fabricated from a light blocking material, which may be a metal, such as aluminum, copper, nickel, silver, aurum, tantalum, niobium, neodymium, chromium, titanium, and/or an alloy of such metals. For example, light barrier 502 may be made of an aluminum foil material that has a thickness ranging from 30 nanometers (nm) to 60 nm. Another example of the light blocking material is plastic.

Light barrier 502 extends from foreground screen 404 to background screen 408. Light barrier 502 may have the same diameter as that of background screen 408 and an x-y cross-section that is concentric with an x-y cross-section of background screen 408. Light barrier 502 also has an x-y cross-section that is concentric with an x-y cross-section of foreground screen 404.

Foreground screen 404 includes an inner portion 417 and an outer portion 420 that surrounds the inner portion 417. Foreground screen 404 may be of the same diameter as a diameter of opening 418 of front cover 402 or may be of a different diameter than the diameter of opening 418. CPU 308 controls secondary video controller 338 so that an image is not displayed within inner portion 417 of foreground screen 404 during play of a secondary game.

An x-y cross-section of each of top cover 402, light barrier 502, foreground screen 404, interstitial layer 406, background screen 408, ring-shaped light source 410, light source 412, and/or back cover 414 has a center that is located on a central axis 434.

In alternative embodiments, light source 410 may be polygonal in shape. For example, it may have a square, an octagonal, or a pentagonal shape. In further alternative embodiments, light source 410 is not located in the same x-y plane as background screen 408. For example, ring-shaped light source 410 is located between foreground screen 404 and background screen 408. In yet another embodiment, light source 410 is not concentric with background screen 408.

Moreover, alternatively, system 400 does not need to include interstitial layer 406. For example, in such an embodiment, any interference is removed by using a striped pixel pattern in the foreground screen 404 or background screen 408, and a forty-five degree diagonal pixel pattern in the other of the foreground screen 404 or background screen 408.

In one alternative embodiment, interstitial layer 406 has a smaller diameter than that of light barrier 502. For example, a diameter of interstitial layer 406 is between 1 and 3 millimeters (mm) less than that of light barrier 502.

Interstitial layer 406 may have a different shape than that of light barrier 502. For example, interstitial layer 406 may have a polygonal x-y cross-section, while light barrier 502 has a circular x-y cross-section. As another example, an x-y cross-sectional shape of interstitial layer 406 is circular and an x-y cross-sectional shape of light barrier is polygonal.

In another embodiment in which foreground screen 404 is an LCD display device and background screen 408 is an LED display device, system 400 does not include light source 412. The LED display device, in this embodiment, includes LEDs that emit colored light.

In a further alternative embodiment, light barrier 502 has a diameter slightly larger, such as by 1 to 3 mm, than a diameter of background screen 408 to surround background screen 408. In an alternative embodiment, an x-y cross-section of light barrier 502 is not concentric with an x-y cross-section of background screen 408. Alternatively, an x-y cross-section of light barrier 502 is not concentric with an x-y cross-section of foreground screen 404.

Also, foreground screen 404 may have a different shape than that of background screen 408. For example, foreground screen 404 may be circular in shape, while background screen 408 is polygonal, such as octagonal or hexagonal, in shape. As another example, background screen 408 is circular in shape, while foreground screen 404 is polygonal in shape. In an alternative embodiment, foreground screen 404 and background screen 408 are of different shapes than that shown in FIG. 4. For example, each of foreground screen 404 and background screen 408 has a polygonal shape.

In still another embodiment, system 400 does not include light barrier 502.

In a further embodiment, foreground screen 404 may have a different, such as a smaller, diameter than that of opening 418 of front cover 402. The diameter of foreground screen 404 may be 1 to 4 mm smaller than that of opening 418 of front cover 402.

Figure 5:
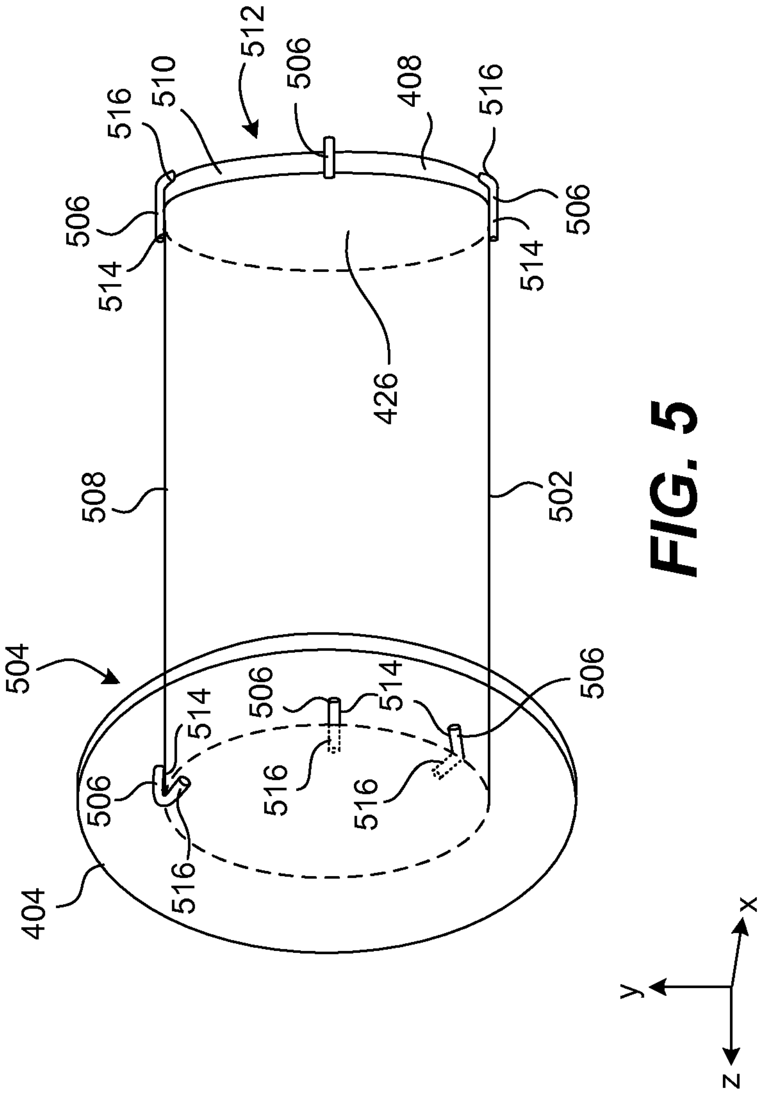
FIG. 5 is a schematic view of an embodiment of a light barrier of the system of FIG. 4.

As shown in FIG. 5, light barrier 502 is secured to a back surface 504 of foreground screen 404 by a set of pins 506. Back surface 504 of foreground screen 404 is fabricated from glass or plastic. Each pin 506 has a first flat portion 514 and a second flat portion 516, which is angled. The second flat portion may form a right angle, an acute angle or an obtuse angle with respect to the first flat portion. First flat portion 514 is fastened to an outer surface 508 of light barrier 502, and second flat portion 516 is fastened to back surface 504 of foreground screen 404. Care should be taken not to damage any display elements of foreground screen 404 when fastening pins 506 to back surface 504 of foreground screen 404.

Similarly, another set of pins 506 extend from outer surface 508 of light barrier 502 around a side surface 510 of background screen 408 to a back surface 512 of background screen 408, and the pins are fastened to outer surface 508 of light barrier 502. For example, first flat portion 514 is fastened to outer surface 508 and second flat portion 516 is fastened to back surface 512. Again, care should be taken to prevent damage to any display elements of background screen 408 when fastening pins 506 to back surface 512 of background screen 408.

Light barrier 502 is secured to back surface 504 of foreground screen 404 via any appropriate securing mechanism, such fastening pins 506, glue and/or Velcro™. Light barrier 502 is also secured to back surface 512 of background screen 408 via an appropriate securing mechanism.

Referring back to FIGS. 3 and 4, CPU 308 controls secondary video controller 338 to display foreground image 422, such as a video pointer 430, a bonus multiplier 432, or another graphical element, of the secondary game on foreground screen 404. Foreground image 422 may be a static or a dynamic image. For example, foreground image 422 may be a flying airplane, a rotating pointer, or a talking Mickey Mouse™, which are examples of dynamic images. As another example, foreground image 422 may be a stationary airplane, or stationary Mickey Mouse™, which are examples of static images. Foreground image 422 includes at least one graphical element. The bonus multiplier 432 may be an integer or a fraction.

Further, during play of the secondary game, CPU 308 controls secondary video controller 336 to display a background image 424, such as a wheel of a wheel-based game; a segment 429 of the wheel; a compartment (not shown) of a tic-toe-game; or another graphical element. Background image 424 may be a static or a dynamic image. For example, background image 424 may be a spinning wheel, a moving boat, or a talking Indiana Jones™, which are examples of a dynamic image. As another example, background image 424 may be a stationary car or stationary Mickey Mouse™, which are examples of a static image. Each of foreground image 422 and background image 424 may be a three-dimensional image, such as an image having shading to provide a virtual depth to the image. The wheel of FIG. 4 includes a number of segments 429 that include a number of credits and descriptions of prizes, such as a car or a trip to an exotic location, to be awarded to a user upon achieving a winning outcome of the secondary game.

During play of the secondary game, the light blocking material of light barrier 502 prevents light emitted by ring-shaped light source 410 from illuminating inner portion 417 of foreground screen 404 and from illuminating a display surface 426 of background screen 408.

CPU 308 controls light source 412, via a light driver (not shown), to emit white light or colored light and controls ring-shaped light source 410, via another light driver (not shown), to also emit white light or colored light. Examples of any of the light drivers include a set of transistors. Ring-shaped light source 410 illuminates outer portion 420 of foreground screen 404. Light source 412 illuminates background screen 408 and inner portion 417 of foreground screen 404 by passing through background screen 408.

After initiation of the secondary game and during play of the secondary game, CPU 308 controls light source 412 to emit white light or colored light, controls secondary video controller 336 to display background image 424 on background screen 408, controls ring-shaped light source 410 to emit white light or colored light, and controls secondary video controller 338 to display the foreground image 422 on foreground screen 404. This provides an image having an actual three-dimensional (3D) depth, which is perceived by a user viewing the secondary game via opening 418 of front cover 402.

The actual 3D depth is created by a physical separation between foreground screen 404 and background screen 408. During play of the secondary game, CPU 308 controls secondary video controller 338 such that any portion of foreground image 422 within inner portion 417 of foreground screen 404 is not displayed.

After each spin of the wheel, for example, CPU 308 multiplies bonus multiplier 432 with an amount of credits, on background screen 408, pointed to by video pointer 430 if a user achieves a winning outcome by playing the secondary game. After each spin of the wheel, upon determining that a winning outcome is achieved by playing the secondary game, CPU 308 multiplies the bonus multiplier 432 with the amount of credits pointed to by video pointer 430 to generate a number of secondary game credits of the secondary game. Silk screen panel 140 (FIG. 1) and silk screen panel 208 (FIG. 2) display a map between the secondary game outcome and a number of secondary game credits that may be awarded to a user when the secondary game outcome is a winning outcome. CPU 308 adds the secondary game credits for all spins of the wheel to the primary game credits, divides the total number of primary and secondary game credits by a game denomination, and outputs a value via the value output device to a user.

If video pointer 430 points to a prize at the end of a wheel spin, the prize is a winning outcome achieved for playing the secondary game. In this case, in which a winning outcome is the prize, CPU 308 controls the value output device to award a value to a user for achieving a winning outcome of the primary game and alerts an administrator of the gaming establishment 301 that the user has won the prize. CPU 308 alerts the administrator by displaying a prize winning indication on an overhead display device (not shown). This is driven by causing primary video controller 318 to display the description on primary display device 112. Alternatively, the alert is provided by controlling secondary display controllers to display the description on secondary display device 340. The alert may also be provided by controlling audio controller 330 to output sounds via speakers 132.

In a further alternative embodiment, foreground image 422 does not include the bonus multiplier 432 but includes video pointer 430. During play of the secondary game, CPU 308 may also control secondary video controller 338 to change the bonus multiplier 432 each time the video pointer 430 passes a number of segments 429 of the wheel.

In a further embodiment, during play of the secondary game, CPU 308 controls secondary video controller 338 to change an amount of credits, displayed within a segment 429, at any time during the play of the secondary game. For example, each time the video pointer 430 passes a segment 429 of the wheel, CPU 308 controls secondary video controller 338 to change an amount of credits displayed within the segment 429 of the wheel to which the video pointer 430 points changes to a different amount than that displayed within the same segment 429 preceding the change.

Alternatively, before enrolling a user in the secondary game, CPU 308 determines whether a bet made in the primary game is greater than a threshold or whether a side bet is made in the primary game. Upon determining that the bet made in the primary game is not greater than the threshold or that a side bet is not made in the primary game, CPU 308 controls secondary video controller 336 to not change an indicia, such as an amount of credits within one or more of segments 429 or an amount of the bonus multiplier 432. For example, during the play of the primary game, CPU 308 controls secondary video controller 336 to display an amount '100' of credits in a particular segment 429 on background screen 408 before a user makes a wager in the primary game. In this example, upon determining that a user makes a bet for each event, such as a spin of reels of a slot machine game or each round of Blackjack game, less than the threshold or does not make a side bet for the event, CPU 308 determines that a wager made by the user to play the primary game is less than the threshold and controls secondary video controller 336 to not change the amount '100' of credits in that particular segment 429.

In this embodiment, on the other hand, upon determining that the bet made in the primary game is greater than the threshold or that a side bet is made in the primary game, CPU 308 controls secondary video controller 338 to change the indicia displayed on foreground screen 404 or on background screen 408 and/or informs a user of the change in the indicia via primary display device 112. This change is made after the start of the primary game and before enrolling a user in the secondary game. As an example, during play of the primary game, CPU 308 controls secondary video controller 336 to display an amount '50' of credits in a particular segment 429 on background screen 408 before a user makes a wager to play the primary game. In this example, upon determining that a user makes a bet that is greater than the threshold or upon determining that the user makes a side bet for the event, CPU 308 controls secondary video controller 336 to change the amount '50' of credits in that particular segment 429 to '200'. As another example, during the play of the primary game and before enrolling a user in the secondary game, CPU 308 controls secondary video controller 336 to display an amount '50' of credits in particular segment 429 on background screen 408. In this example, during the play of the primary game and before enrolling a user in the secondary game, upon determining that the user makes a bet for the primary game that is greater than the threshold or upon determining that the user makes a side bet for the primary game, CPU 308 controls secondary video controller 336 to change the amount '50' of credits on that particular segment 429 to '150' or to a description of the prize, and controls primary video controller 318 to display a message on primary display device 112 that the amount is changed from '50' to '150' or is changed to a description of the prize.

In an alternative embodiment, during play of the secondary game, CPU 308 controls secondary video controllers 336 and 338 to move background image 424 from background screen 408 to inner portion 417 of foreground screen 404 periodically or upon an occurrence of an event, such as achieving a winning outcome of the secondary game at an end of a spin of the wheel. CPU 308 also turns on ring-shaped light source 410 and light source 412. CPU 308 further controls secondary video controller 336 to display background image 424 on background screen 408 at a first time, controls secondary video controller 338 to display foreground image 422 on foreground screen 404 at the first time, and then controls secondary video controller 336 to not display background image 424 on background screen 408 at a second time consecutive to the first time. CPU 308 further controls secondary video controller 338 to display the foreground image 422 within outer portion 420 and background image 424 within inner portion 417 of foreground screen 404 at the second time. Such a movement from background screen 408 to foreground screen 404 of background image 424 makes the background image dynamic. Without the movement, background image 424 is static.

In a further embodiment, during play of the secondary game, in addition to moving background image 424 from background screen 408 to foreground screen 404, CPU 308 controls secondary video display controllers 336 and 338 to move the background image 424 back from inner portion 417 of foreground screen 404 to background screen 408. For example, after moving background image 424 from background screen 408 to foreground screen 404, CPU 308 controls ring-shaped light source 410 to emit white light or colored light, controls light source 412 to emit white light or colored light, controls secondary video controller 336 to display background image 424 on background screen 408 at a third time consecutive to the second time, and controls secondary video controller 338 to display foreground image 422 on foreground screen 404 and not display the background image 424 on foreground screen 404 at the third time.

Another embodiment is similar to the embodiment described above with reference to FIG. 4 except that background screen 408 is an LED display device, such as an OLED display device; foreground screen 404 is an LCD device; and light source 412 is not included. The LED display device includes LEDs that emit light to display background image 424. An operation of this embodiment is similar to the operation of the embodiment described with reference to FIG. 4.

Yet another embodiment is similar to the embodiment described above with reference to FIG. 4 except that foreground screen 404 is an LED display device, such as an OLED display device; background screen 408 is an LCD device; and ring-shaped light source 410 is not included. The LED display device includes LEDs that emit colored light to display foreground image 422. An operation of this embodiment is similar to the operation of this embodiment described with reference to FIG. 4.

In a further embodiment, a mechanical pointer instead of a video pointer 430 is used in any system described herein. For example, the mechanical pointer is attached to foreground screen 404 and is driven by a motor (not shown) controlled by CPU 308 to have a circular or other motion.

Some technical effects of the above-described systems and methods include preventing light emitted from ring-shaped light source 410 from illuminating inner portion 417 of foreground screen 404 and from illuminating background screen 408 (FIG. 4). Light barrier 502 prevents light emitted from ring-shaped light source 410 from reaching inner portion 417 of foreground screen 404 and from reaching display surface 426 of background screen 408.

Figure 6:
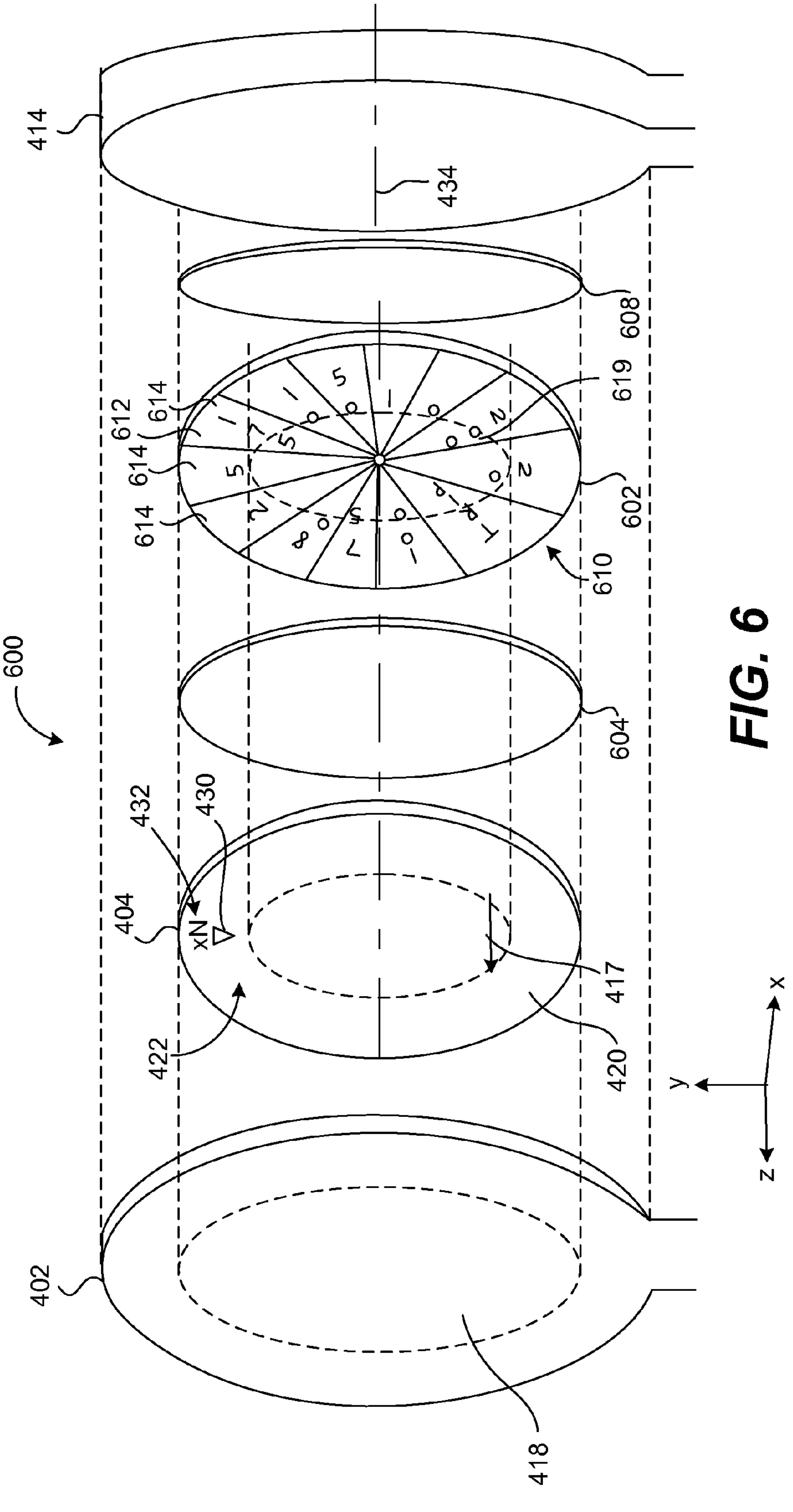
FIG. 6 is a schematic view of another embodiment of a system for playing the secondary game.

FIG. 6 illustrates a system 600 for playing a secondary game. System 600 is similar to system 400 (FIG. 4) in that it includes a background screen 602, an interstitial layer 604, and a light source 608. However, system 600 does not include ring-shaped light source 410 and light barrier 502.

System 600 further includes front cover 402 of top box 104 (FIG. 1), foreground screen 404 (FIG. 4), and back cover 414 of top box 104. Background screen 602 displays a background image 610, which may be a three-dimensional image, such as an image having shading to provide a virtual depth to the image. Background image 610 may be a static or dynamic image. For example, background image 610 may be a spinning wheel, a moving car, or a talking Indiana Jones™, which are examples of dynamic images. As another example, background image 610 may be a stationary bicycle or stationary Mickey Mouse™, which are examples of static images. Interstitial layer 604 is an example of interstitial layer 334 (FIG. 3). Background screen 602 is an example of background screen 342 (FIG. 3).

Interstitial layer 604, background screen 602, and light source 608 are located inside top box 302 (FIG. 3). Light source 608 may be an LED light source or a cold cathode fluorescent light (CCFL) source that provides white or colored light. Light source 608 may or may not have the same shape as that of background screen 602. For example, light source 608 may have a rectangular or square x-y cross-section while background screen 602 has a circular x-y cross-section. Light source 608 may or may not have the same diameter as that of background screen 602.

Foreground screen 404 may have a circular shape like background screen 602 and have the same diameter as that of background screen 602.

Interstitial layer 604 is placed between foreground screen 404 and background screen 602. Interstitial layer 604 performs the same function with respect to foreground and background screens 404 and 602 as that performed by interstitial layer 406 with respect to foreground and background screens 404 and 408 (FIG. 4). Interstitial layer 604 may have the same diameter and shape as that of foreground and background screens 404 and 602.

CPU 308 controls secondary video controller 338 to display foreground image 422 of the secondary game on foreground screen 404. Further, CPU 308 controls secondary video controller 336 to display background image 610 on background screen 602. The background image 610 may be a wheel of a wheel-based game, a segment 614 of the wheel, a number of credits, a description of a prize, a compartment of a tic-toe-game, or another graphical element. Background image 610 includes at least one graphical element, such as a wheel of a wheel-based game or an 'X' symbol of a tic-tac-toe game. The wheel of FIG. 6 includes a number of segments 614 that include a number of credits and descriptions of prizes to be awarded to a user upon achieving a winning outcome of the secondary game. As an example, a winning outcome of the secondary game is achieved when video pointer 430 points to segment 614 after a spin of the wheel.

During play of the secondary game, CPU 308 controls the operation of light source 608, via a light driver (not shown). The light drivers may include a set of transistors. CPU 308 causes light source 608 to turn on, controls secondary video controller 336 (FIG. 3) to display background image 610 on background screen 602, and controls secondary video controller 338 (FIG. 3) to display the foreground image 422 on foreground screen 404. This provides an actual 3D depth, which is perceived by a user viewing the secondary game via opening 418 of front cover 402. The actual 3D depth is created by a physical separation between foreground screen 404 and background screen 602.

An x-y cross-section of each of top cover 402, foreground screen 404, interstitial layer 604, background screen 602, light source 608, and/or back cover 414 has a center that is located on central axis 434.

If video pointer 430 points to a prize at an end of a wheel spin, for example, the prize is a winning outcome achieved for playing the secondary game. In this case, in which a winning outcome is the prize, CPU 308 controls the value output device to award a value to a user for achieving a winning outcome on the primary game and alerts the administrator of the gaming establishment 301 that the user has also won the prize. CPU 308 alerts the administrator in a similar manner as described above.

In a further embodiment, interstitial layer 604 has a different diameter than foreground screen 404 and/or background screen 602. In an alternative embodiment, interstitial layer 604 has a different shape than foreground screen 404 and/or background screen 602. For example, interstitial layer 604 may have a polygonal shape and each of foreground screen 404 and background screen 602 may have a circular shape.

In another embodiment, system 600 does not include interstitial layer 604. For example, in such an embodiment, a Moiré interference pattern created by an interference between the foreground screen 404 and background screen 602 is removed by using a stripe pixel pattern in the foreground screen 404 or background screen 602 and by using a forty-five degree diagonal pixel pattern in the remaining of the foreground screen 404 or background screen 602.

In yet another embodiment in which foreground screen 404 is an LCD display device and background screen 602 is an LED display device, system 600 does not include light source 608.

In a further alternative embodiment, foreground screen 404 is of a different shape than a shape background screen 602. For example, foreground screen 404 is circular in shape and background screen 602 is polygonal in shape. As another example, background screen 602 is circular in shape and foreground screen 404 is polygonal in shape. Alternatively, foreground screen 404 and background screen 602 are of different shapes than that shown in FIG. 6. For example, each of foreground screen 404 and background screen 602 has a polygonal shape.

In an alternative embodiment, during play of the secondary game, at certain time periods or upon an occurrence of an event, CPU 308 controls secondary video controllers 336 and 338 to move background image 610 from background screen 602 to inner portion 417 and/or outer portion 420 of foreground screen 404. CPU 308, at certain time periods or upon the occurrence of the event, further controls the secondary video controllers 336 and 338 to move foreground image 422 from outer portion 420 of foreground screen 404 to an outer portion 612 and/or an inner portion 619 of background screen 602. CPU 308 also controls light source 608 to emit white light or colored light, and controls secondary video controller 336 to display background image 610 on background screen 602 at a first time. CPU 308 further controls secondary video controller 338 to display foreground image 422 on foreground screen 404 at the first time. CPU 308 then controls secondary video controller 336 to not display background image 610 on background screen 602 at a second time and to rescale and display background image 610 in inner portion 417 of foreground screen 404. CPU 308 also controls secondary video controller 338 to display the foreground image 422 on outer portion 612 and/or inner portion 619 of background screen 602 at the second time. By performing the rescaling, CPU 308 controls secondary video controller 338 to display the background image 610 in inner portion 417 of foreground screen 404. Such a movement from background screen 602 to foreground screen 404 of background image 610 makes the background image 610 dynamic and the movement of foreground image 422 from foreground screen 404 to background screen 602 makes the foreground image 422 dynamic. Without the movement, foreground image 422 is static.

In a further embodiment, during play of the secondary game, in addition to moving background image 610 from background screen 602 to inner portion 417 and/or outer portion 420 of foreground screen 404 and moving foreground image 422 from foreground screen 404 to inner portion 619 and/or outer portion 612 of background screen 602, CPU 308 controls secondary video display controllers to move the background image 610 back from foreground screen 404 to inner portion 619 and/or outer portion 612 background screen 602 and the foreground image 422 back from background screen 602 to inner portion 417 and/or outer portion 420 of foreground screen 404. For example, after moving background image 610 from background screen 602 to inner portion 417 and/or outer portion 420 of foreground screen 404, CPU 308 controls light source 608 to emit white light or colored light. In this example, CPU 308 controls secondary video controller 336 to display background image 610 on background screen 602 at a third time, and controls secondary video controller 338 to display foreground image 422 on inner portion 417 and/or outer portion 420 of foreground screen 404. Further, in this example, CPU 308 controls secondary video controller 338 to not display the background image 610 on foreground screen 404 at the third time and further to display background image 610 on inner portion 619 and/or outer portion 612 of background screen 602.

In another embodiment, background image 602 is displayed within inner portion 619 of background screen 602 and is not displayed within outer portion 612 of background screen 602. Alternatively, foreground image 422 is displayed within inner portion 417 of foreground screen 404 and is not displayed within outer portion 420 of foreground screen 404.

Another embodiment is similar to the embodiment described above with reference to FIG. 6 except that background screen 602 is an LED display device, such as an OLED display device, foreground screen 404 is an LCD device, and light source 608 is not included. The LED display device includes LEDs that emit colored light. An operation of this embodiment is similar to the operation of the embodiment described with reference to FIG. 6.

Yet another embodiment is similar to the embodiment described above with reference to FIG. 6 except that foreground screen 404 is an LED display device, such as an OLED display device, and background screen 602 is an LCD device. The LED display device includes LEDs that emit colored light. An operation of this embodiment is similar to the operation of this embodiment described with reference to FIG. 6.

In alternative embodiments, during play of the secondary game, CPU 308 controls secondary video controller 338 to change the bonus multiplier 432 each time the video pointer 430 passes a number of segments 614 of the wheel. For example, when pointer 430 passes segment 614, CPU 308 controls secondary video controller 338 to change an amount of bonus multiplier 432 from ‘2’ to ‘3’.

In another embodiment, during play of the secondary game, CPU 308 controls secondary video controller 338 to change an amount of credits within any of the segments 614 at any time during the play of the secondary game. For example, each time video pointer 430 passes the segment 614 of the wheel, an amount of credits within the segment 614 of the wheel to which the video pointer 430 points to a different amount than that displayed within the same segment 614 preceding the change.

Alternatively, before enrolling a user in the secondary game, CPU 308 determines whether a bet made in the primary game is greater than the threshold or whether a side bet is made in the primary game. Upon determining that the bet made in the primary game is not greater than the threshold or that a side bet is not made in the primary game, CPU 308 controls secondary video controller 338 to not change a sign, such as an amount of credits within one or more of the segments 614, or not change the bonus multiplier 432. For example, during the play of the primary game, CPU 308 controls secondary video controller 336 to display an amount ‘10’ of credits in the particular segment 614 on background screen 602. In this example, upon determining that a user makes a bet for each event, such as a spin of reels of a slot machine game or each round of Blackjack game, less than the threshold or does not make a side bet for the event, CPU 308 controls secondary video controller 336 to not change the amount ‘100’ of credits on that particular segment 614 between the start of the primary game and the start of the secondary game.

In this embodiment, on the other hand, upon determining that the bet made in the primary game is greater than the threshold or that a side bet is made in the primary game, CPU 308 controls secondary video controllers 336 to change the sign and/or informs a user of the change in the sign via primary display device 112. This change is made between the start of the primary game and enrolling a user in the secondary game. As an example, during play of the primary game, CPU 308 controls secondary video controller 336 to display an amount ‘50’ of credits in the particular segment 614 on background screen 602. In this example, upon determining that a user makes a bet that is greater than the threshold or upon determining that the user makes a side bet for the event, CPU 308 controls secondary video controller 336 to change the amount ‘10’ of credits on that particular segment 614 to ‘150’. As yet an example, during the play of the primary game and before enrolling a user in the secondary game, CPU 308 controls secondary video controller 336 to display an amount ‘50’ of credits on particular segment 614 on background screen 602. In this example, during the play of the primary game and before enrolling a user in the secondary game, upon determining that the user makes a bet that is greater than the threshold or upon determining that the user makes a side bet, CPU 308 controls secondary video controller 336 to change the amount ‘50’ of credits on that particular segment 614 to ‘150’ or to a description of the prize, and controls primary video controller 318 to display a message on primary display device 112 that the amount is changed from ‘10’ to ‘150’ or is changed to a description of the prize.

Figure 7:
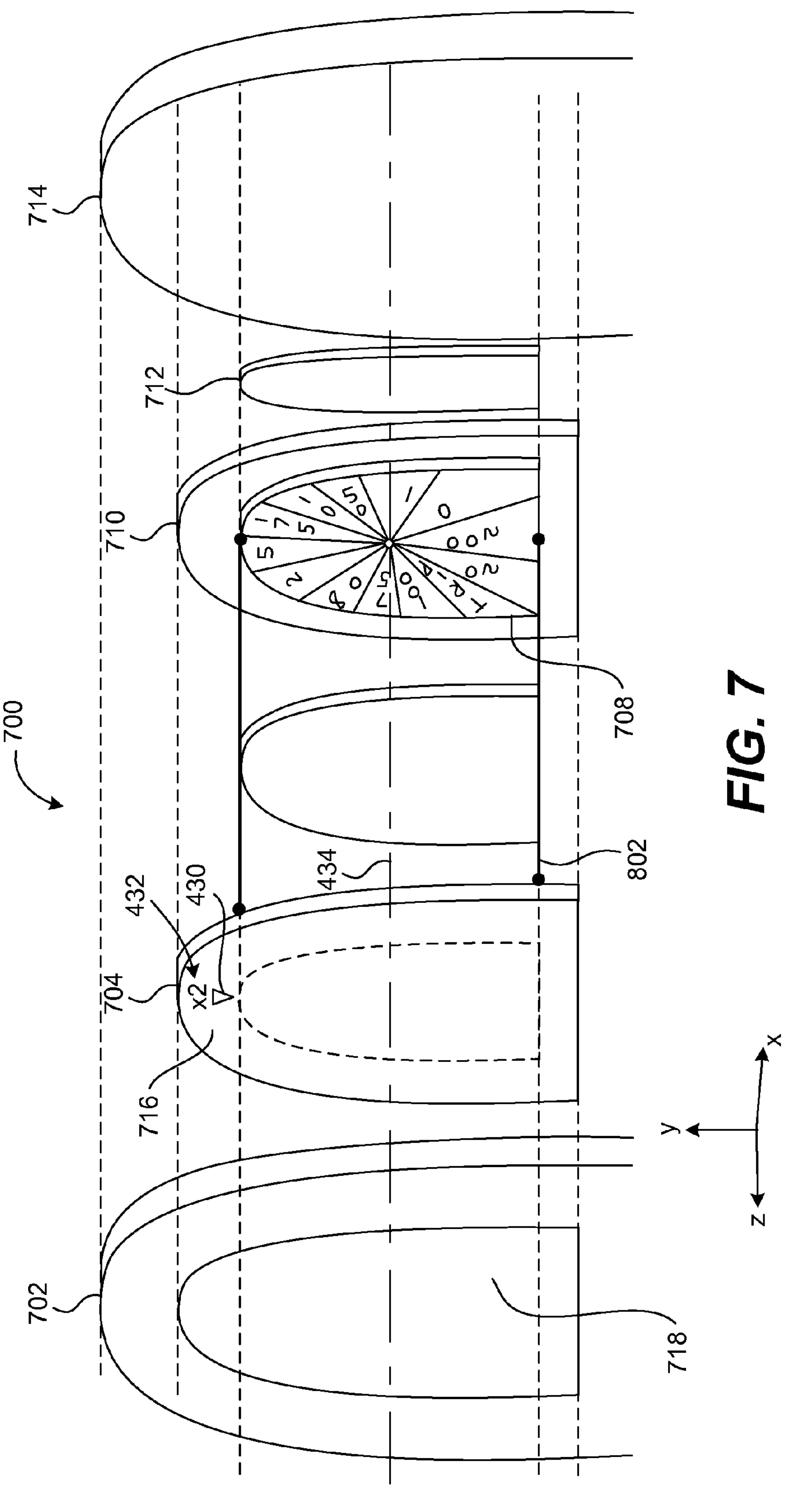
FIG. 7 is a schematic view of yet another embodiment of a system for playing the secondary game.
Figure 8:
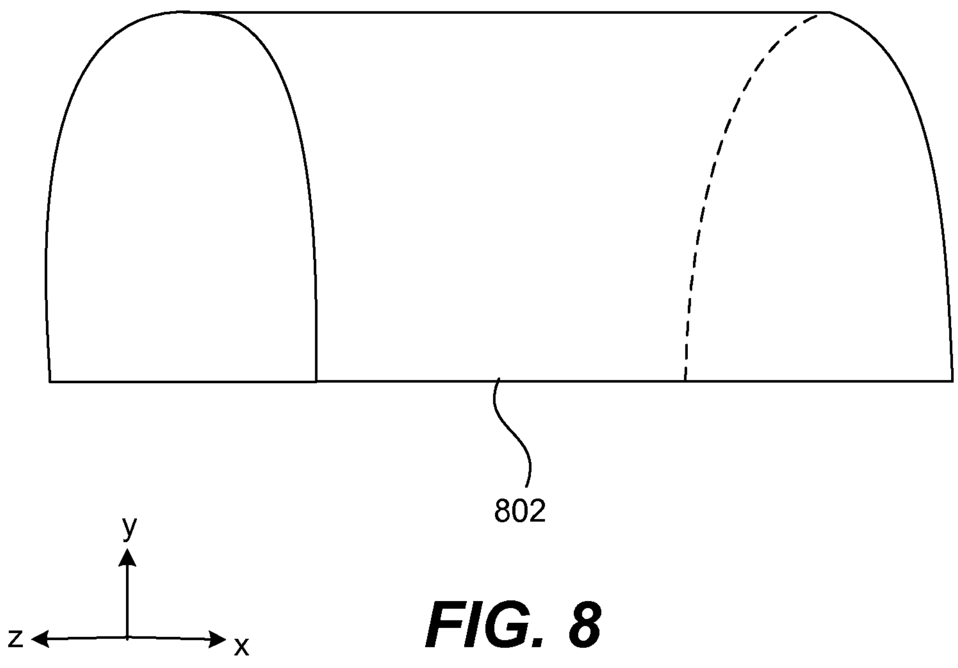
FIG. 8 is a schematic view of an embodiment of a light barrier of the system of FIG. 7.

FIG. 7 illustrates a system 700 for playing a secondary game, and FIG. 8 illustrates a light barrier 802. The system 700 is similar to the system 400 of FIG. 4 except that the circular-shaped components shown in FIG. 4 are replaced with tombstone-shaped components. For example, a front cover 702 of top box 202, a foreground screen 704, a diffuser 706, a background screen 708, a light source 710, a light source 712, and a back cover 714 of top box 202, each have a tombstone-shaped configuration. Further, tombstone-shaped light source 710 may surround tombstone-shaped background screen 708. A front surface 716, which is a surface on which a foreground image is displayed, of foreground screen 704 is visible to the user via an opening 718 in front cover 702.

The operation of system 700 is similar to the operation of system 400. Moreover, any alternate structures and methods of operations of system 700 are also similar to the alternate structures and methods of operations of system 400. Additionally, light barrier 802 is secured to tombstone-shaped foreground screen 704 and tombstone-shaped background screen 710 in a similar manner in which light barrier 502 is secured to foreground screen 404 and background screen 408 (FIGS. 4 and 5). Light barrier 802 prevents light emitted from tombstone-shaped light source 710 from reaching an inner portion of tombstone-shaped foreground screen 704 and from reaching a display surface of tombstone-shaped background screen 708.

Figure 9:
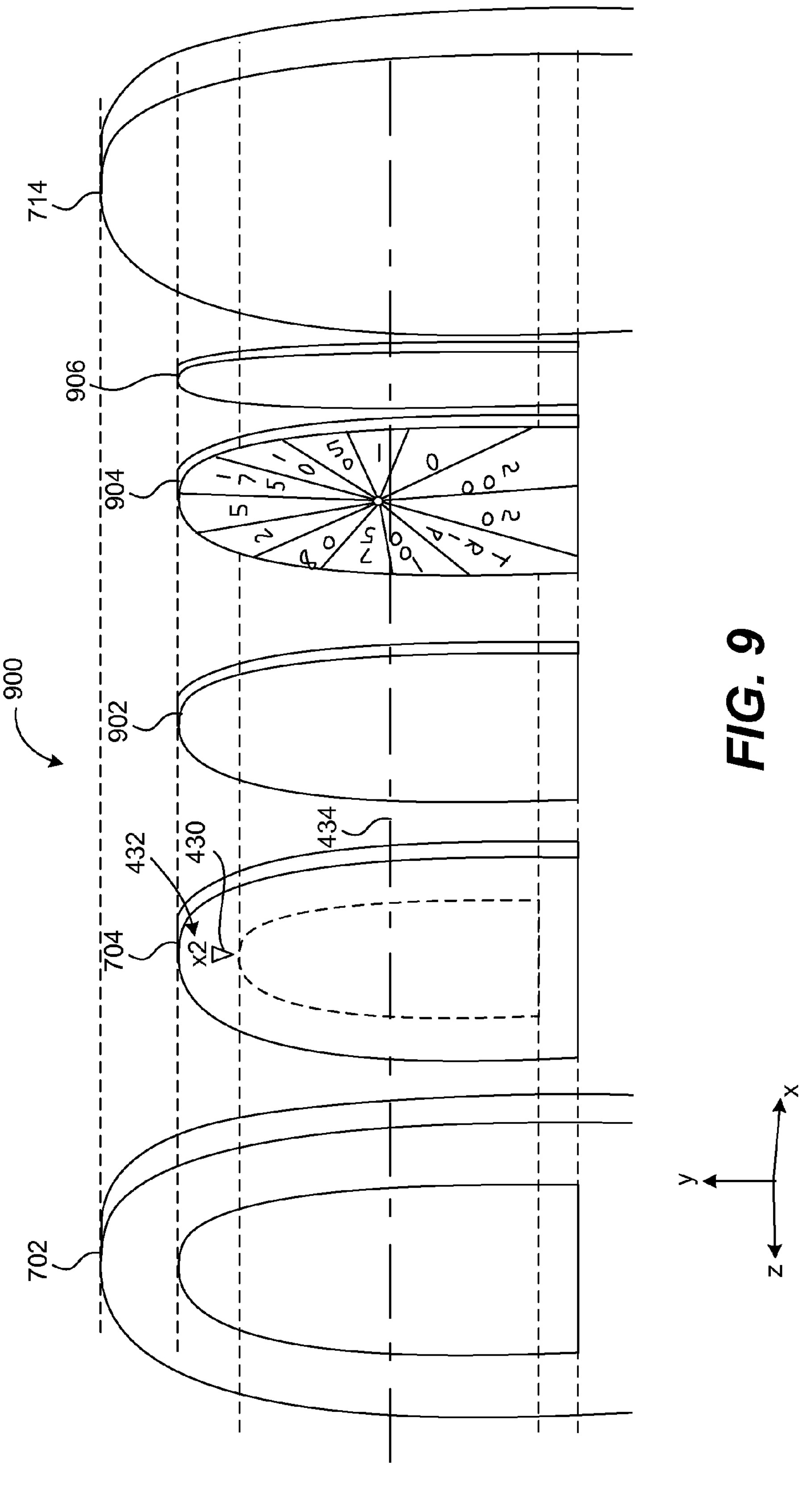
FIG. 9 is a schematic view of still another embodiment of a system for playing the secondary game.

FIG. 9 shows an illustrative system 900 for playing a secondary game. The system 900 is similar to the system 600 of FIG. 6 except that the circular-shaped components of system 600 of FIG. 6 are replaced with tombstone-shaped components. For example, a tombstone-shaped front cover 702 of top box 202 (FIG. 2), a foreground screen 704, a diffuser 902, a background screen 904, a light source 906, and back cover 714 of top box 202 (FIG. 2), each have a tombstone-shaped configuration.

The operation of system 900 of FIG. 9 is similar to the operation of system 600. Moreover, any alternate structures and operations of this embodiment of system 900 of FIG. 9 are also similar to the structures and operations of the alternate embodiments of the embodiment of system 600 of FIG. 6.

Figure 10:
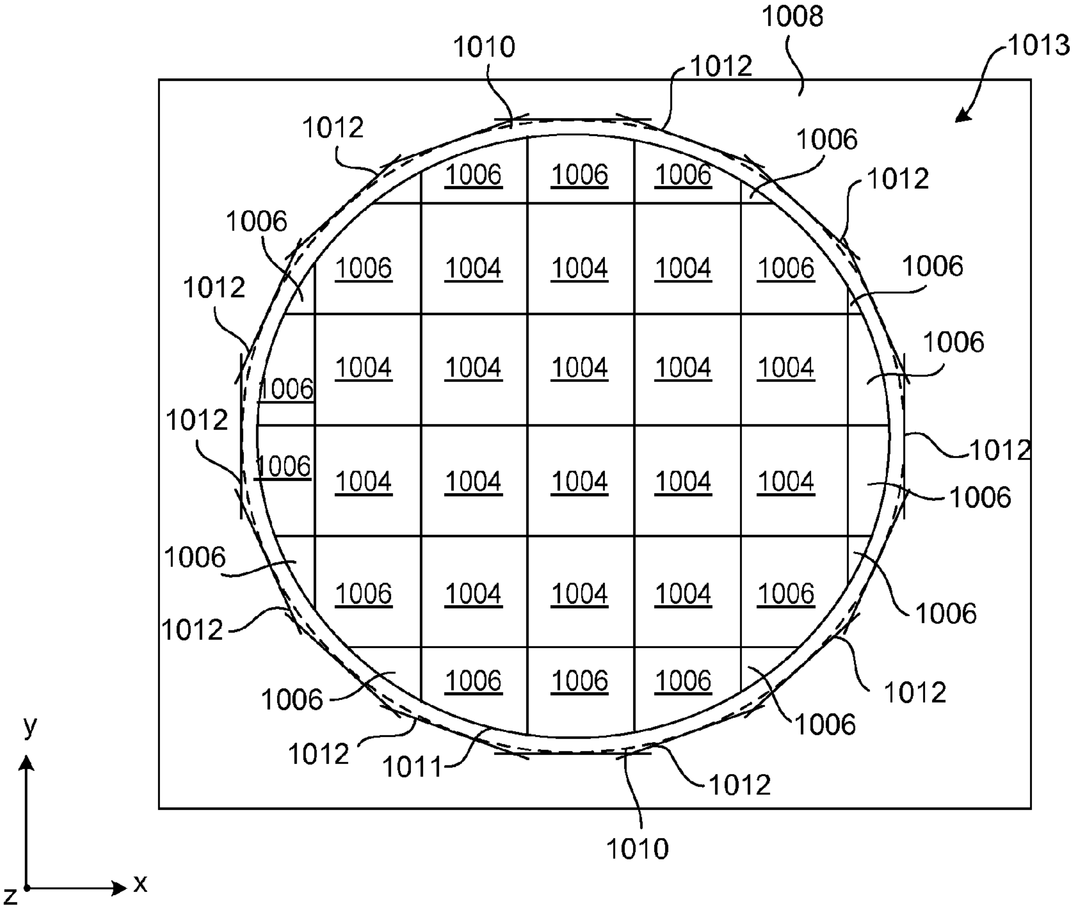
FIG. 10 is a front view of an embodiment of a circular display panel of the gaming machine of FIG. 1.

A circular display panel 1002 is used to fabricate an LCD panel, an LED panel, or an OLED panel, is shown in FIG. 10. Each of the foreground and background screens 404, 408, and 602 (FIGS. 4, 5, and 6) may comprise a circular display panel 1002.

Circular display panel 1002 includes a plurality of pixels 1004 that are not adjacent to a circumference 1011 of circular display panel 1002 and a plurality of pixels 1006 that are adjacent to the circumference 1011. Each pixel 1004 and 1006 includes a red sub-pixel, a blue sub-pixel, and a green sub-pixel. Each pixel has a polygonal shape, such as that of a hexagon, an octagon, a square, or a rectangle. Pixels 1006 have a smaller x-y cross-sectional area than that of pixels 1004. Circular display panel 1002 that includes a thin film transistor substrate and a color filter substrate is used to form an LCD panel after inserting a liquid crystal material between the two substrates. As such, each pixel 1004 and 1006 of circular display panel 1002 includes a thin film transistor and a red, green, and blue color filter.

If circular display panel 1002 is an LED display panel, such as an OLED display panel, each pixel 1004 and 1006 emits colored light. For example, a first pixel of circular display panel 1002 emits red light; a second pixel of circular display panel 1002, adjacent to the first pixel, emits a blue light; and a third pixel of circular display panel 1002, adjacent to the second pixel emits, a green light.

A circular display panel 1002 may be fabricated from a pair of substrates 1008. The pair of substrates 1008 has a top surface 1013 and a bottom surface (not shown). The circular display panel is formed by cutting along a circumference 1011 of a circle 1010 of the pair of substrates. Before or during a time pair of substrates 1008 is cut, the circular display panel 1002 does not include a liquid crystal display material between the two substrates. Rather, a liquid crystal material is inserted between the thin film transistor substrate and the color filter substrate after cutting pair of substrates 1008 to form each of the foreground and background screens 404, 408, and 602 (FIGS. 4, 5, and 6).

In another embodiment, pair of substrates 1008 is cut along a plurality of straight lines 1012 to form circular display panel 1002. The plurality of straight lines 1012 defines the boundaries of circular display panel 1002. Each straight line 1012 intersects a portion of a circumference 1011 of circle 1010.

In another embodiment, pixels 1006 may be of the same size as pixels 1004. A mask, such as top cover 402, is placed over the pixel array formed by pixels 1004 and 1006 to create the circular display panel.

In an alternative embodiment, each pixel 1004 and 1006 includes a red sub-pixel, a green sub-pixel, a blue sub-pixel, and a yellow sub-pixel and a red filter, a green filter, a blue filter, and a yellow color filter.

Figure 11:
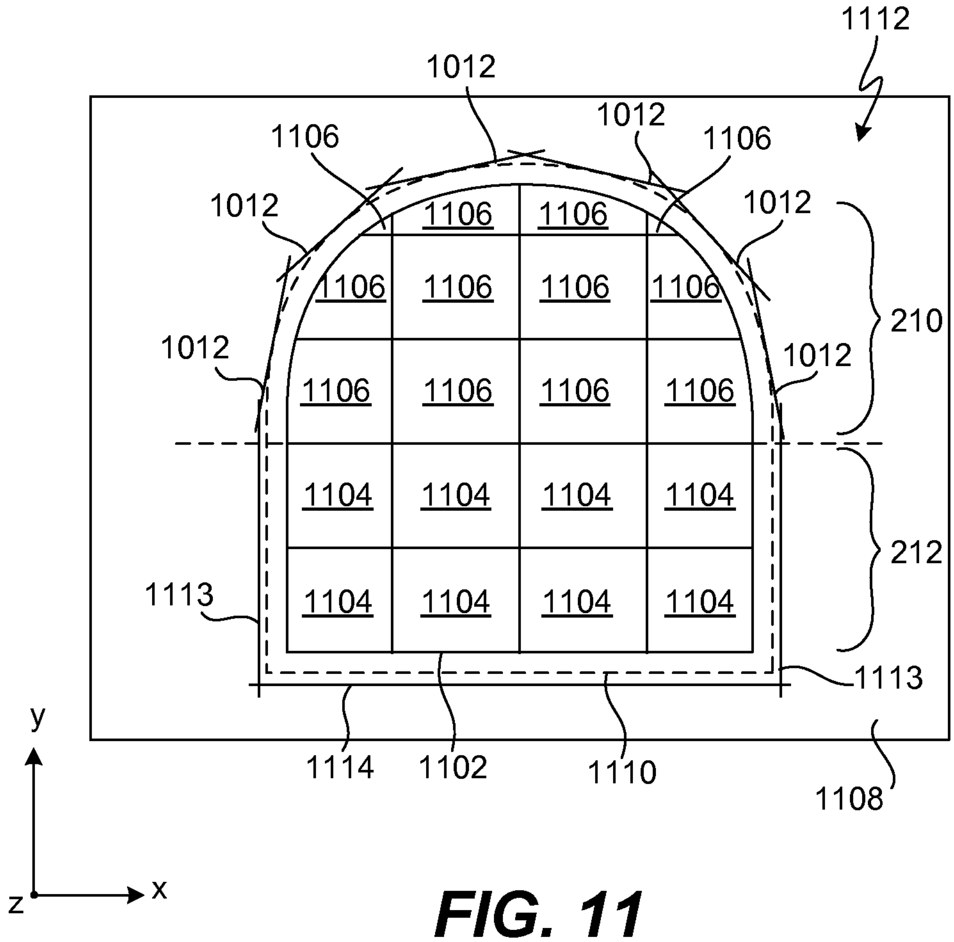
FIG. 11 is a front view of an embodiment of a tombstone-shaped display panel of the gaming machine of FIG. 2.

FIG. 11 is a front view of a tombstone-shaped display panel 1102 that is used to fabricate an LCD panel, an LED panel, or an OLED panel. Tombstone-shaped display panel 1102 may be used to fabricate each of foreground screen 704 and background screens 708 and 904 (FIGS. 7 and 9) after inserting a liquid crystal display material between thin film transistor and color filter substrates of the tombstone-shaped display panel 1102. Tombstone-shaped display panel 1102 includes a plurality of pixels 1104 that are located within straight portion 212. Pixels 1104 may be more or less square. Tombstone-shaped display panel 1102 further includes a plurality of pixels 1106 located within partially curved portion 210. Pixels 1106 may be semi-circular or semi-oval in shape and have at least one straight side.

Pixels 1106 are located adjacent to the perimeter of partially curved portion 210 and have a smaller x-y cross-sectional area than the remaining pixels 1106 of partially curved portion 210 and pixels 1104 of straight portion 212. The remaining pixels of partially curved portion 210 have the same x-y cross-sectional area as pixels 1104 of straight portion 212. Tombstone-shaped display panel 1102 that includes a thin film transistor substrate and a color filter substrate may be used to fabricate an LCD panel, after inserting a liquid crystal material between the two substrates. As such, each pixel 1104 and 1106 of tombstone-shaped display panel 1102 includes a thin film transistor and a red, green, and blue color filter.

If tombstone-shaped display panel 1102 is an LED display panel, which may be an OLED display panel. Each pixel 1104 and 1106 of the tombstone-shaped panel emits red, blue, or green light.

Tombstone-shaped display panel 1102 may also be formed from a pair of substrates 1108 having a top surface 1112 and a bottom surface (not shown). The tombstone-shaped panel is formed by cutting the substrates along a dashed line 1110. Before or during a time pair of substrates 1108 is cut, the tombstone-shaped display panel 1102 does not include a liquid crystal display material between the two substrates. Rather, a liquid crystal material is inserted between the thin film transistor substrate and the color filter substrate after cutting pair of substrates 1108 to form each of the foreground screen 704 and background screens 708 and 904 (FIGS. 7 and 9).

In another embodiment, tombstone-shaped display panel 1102 is fabricated by cutting substrates 1108 along lines 1012, 1113 and 1114.

In yet another embodiment, all pixels 1106 have the same size and shape, and a tombstone-shaped display panel is formed by masking pixels 1104 and 1106 with tombstone-shaped front cover 702.

Figure 12:
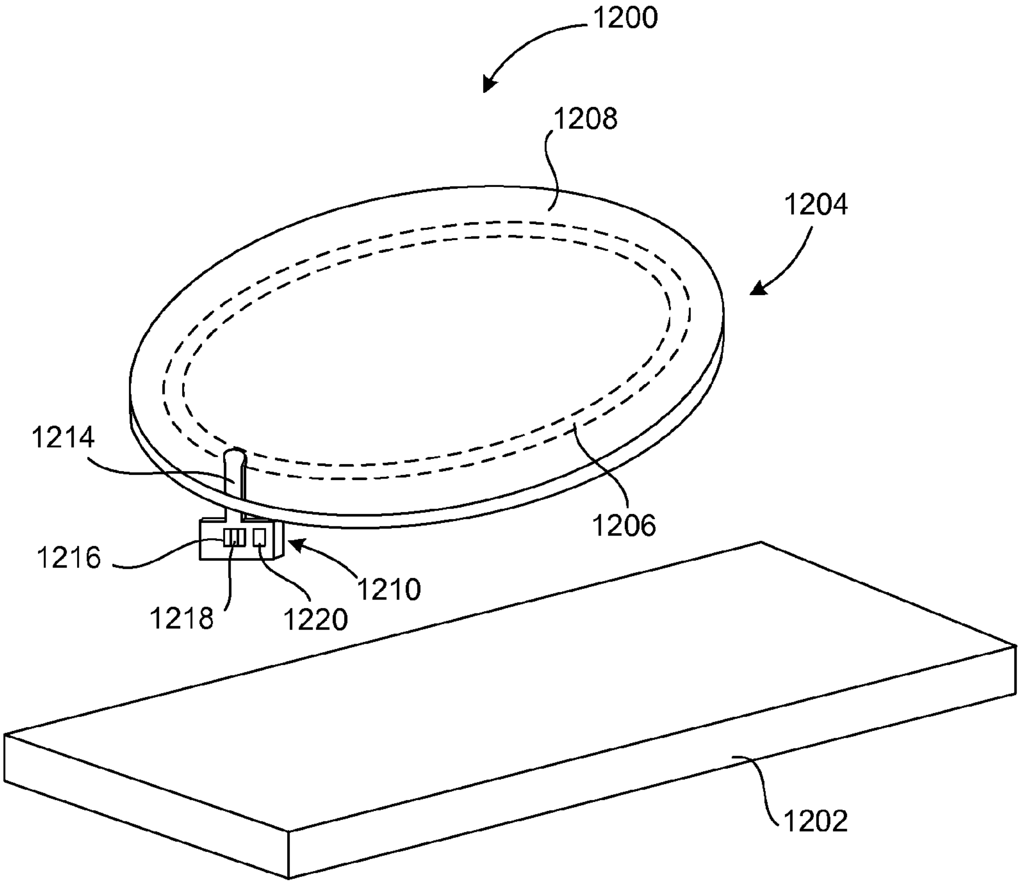
FIG. 12 is a schematic view of an embodiment of a system used to form a circular display panel from a pair of substrates.

FIG. 12 shows an exemplary cutting system 1200 used to form circular display panel 1002 from a pair of substrates 1008 (FIG. 10). Cutting system 1200 includes a first motor (not shown), a table 1202, and a cutting apparatus 1204. The table 1202 supports pair of substrates 1008. The cutting apparatus 1204 may be attached via columns (not shown) to table 1202. Cutting apparatus 1204 includes a circular channel 1206, a top portion 1208, and a cutting tool 1210.

Cutting tool 1210, which is operated by the first motor, is movably fixed to circular channel 1206 to be moved in a circular motion along circular channel 1206. Cutting tool 1210 includes a mount 1214 that has a vertical channel 1216 in which a laser source 1218 is mounted. Laser source 1218 may include a laser oscillator (not shown) and a torch (not shown).

Laser source 1218 generates and condenses an ultraviolet laser beam. Cutting tool 1210 also includes a displacement sensor 1220 that measures the distance between top surface 1013 (FIG. 10) of pair of substrates 1008 and the torch. Sensor 1220 may be a photosensor, such as an LED sensor or an ultrasonic sensor. The torch is moved up and down along vertical channel 1216 by a second motor (not shown).

The pair of substrates 1008 is placed on table 1202 by a carrier robot and the combination is fixed to the table 1202 by a set of support pins (not shown) or by a multitude of vacuum holes formed at table 1202. Based on a signal generated by displacement sensor 1220, the position of the torch within vertical channel 1216 can be changed as appropriate when cutting the substrates.

The laser beam that is guided to a predetermined location, such as at circle 1010 along circumference 1011 of the pair of substrates. While applying the laser beam to the predetermined location, the first motor moves within circular channel 1206 to complete at least one pass around circular channel 1206. As a result, the circular display panel 1002 is fabricated by cutting pair of substrates 1008 (FIG. 10).

Figure 13:
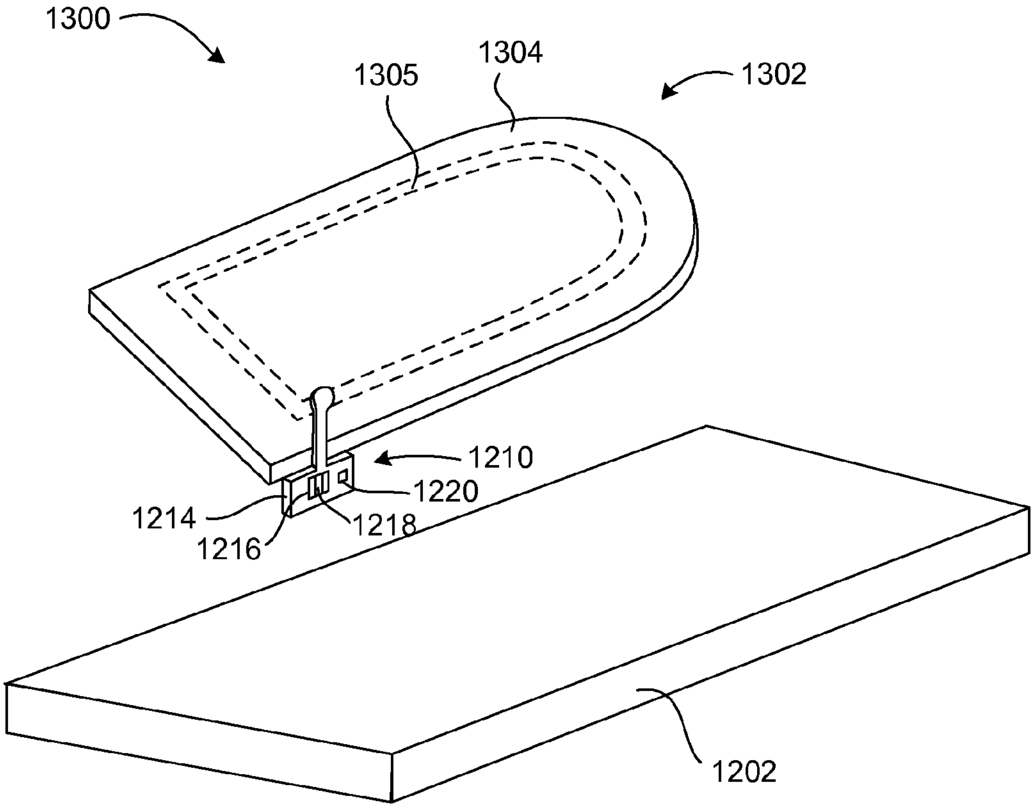
FIG. 13 is a schematic view of an embodiment of a system used to form a tombstone-shaped display panel from a pair of substrates.

FIG. 13 shows an illustrative cutting system 1300 used to cut tombstone-shaped display panel 1102 from pair of substrates 1108 (FIG. 11). Cutting system 1300 is similar to cutting system 1200 except that it includes a tombstone-shaped cutting apparatus 1302 having a tombstone-shaped top portion 1304 and channel 1305. As such, cutting tool 1210 is movably fixed to tombstone-shaped channel 1305 to be moved along tombstone-shaped channel 1305.

Figure 14:
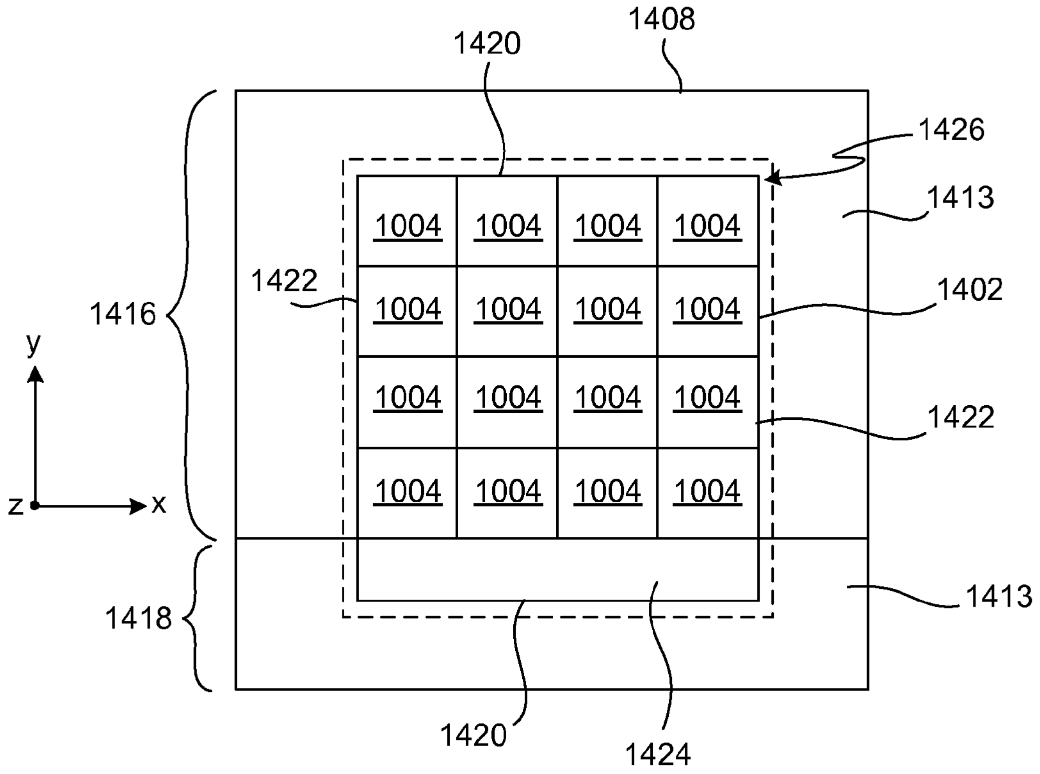
FIG. 14 is a front view of an embodiment of a rectangular-shaped display panel of the gaming machine of FIG. 2

A rectangular display panel 1402, such as an LCD panel, an LED panel or an OLED panel, is shown in FIG. 14. Each of the foreground and background screens 404, 408, 602, 704, 708, and 904 (FIGS. 4, 5, 6, 7, and 9) may include a rectangular display panel 1402.

Rectangular display panel 1402 includes pixels 1004. Rectangular display panel 1402 that includes a thin film transistor substrate and a color filter substrate is used to form an LCD panel after inserting a liquid crystal material between the two substrates. If rectangular display panel 1402 is an LED display panel, such as an OLED display panel, each pixel 1004 emits red, blue, and green light.

A rectangular display panel 1402 may be fabricated from a pair of substrates 1408 (only the top substrate is shown). The pair of substrates 1408 have a top surface 1413 and a bottom surface (not shown). Moreover, the pair of substrates 1408 has a back portion 1416 and a front portion 1418. Back portion 1416 that includes a color filter substrate and a thin film transistor substrate is used to form an LCD panel after inserting a liquid crystal material between the two substrates. The front portion 1418 includes silicon and does not include a color filter substrate, a thin film transistor substrate, or a liquid crystal material. The rectangular display panel is formed by cutting along sides 1420 and 1422 of both rectangular display panel 1402 and an extended portion 1424. Extended portion 1424 extends from rectangular display panel 1402. Cutting is illustrated by dotted lines shown in FIG. 14.

Before or during a time pair of substrates 1408 are cut, the rectangular display panel 1402 does not include a liquid crystal display material between the two substrates. Rather, a liquid crystal material is inserted between the thin film transistor substrate and the color filter substrate of back portion 1416 after cutting pair of substrates 1408. A flexible cable (not shown) is overlaid on or affixed to extended portion 1424 to connect the thin film transistor substrate of back portion 1416 to a circuit board (not shown). The circuit board includes a plurality of drivers to drive the transistors of the thin film transistor substrate of the top portion.

Front cover 402 (FIG. 4) is placed in front of back portion 1416 so that an area of opening 418 (FIG. 4) of the front cover does not extend outside an area of a front face 1426 of back portion 1416. For example, front cover 402 is placed in front of back portion 1416 so that extended portion 1424 is not visible to a player standing in front of the front cover 402. In this case, rectangular display panel 1402 appears to a player to be of the same shape as that of opening 418, which is circular.

The rectangular display panels 1402 are enclosed between front cover 402 and back cover 414 (FIG. 4). Each such rectangular display panel 1402 enclosed in top box 302 formed by the front and back covers 402 and 414 may be of a different size than the other rectangular display panel 1402 also enclosed in the same enclosure.

In an alternative embodiment, front cover 402 (FIG. 4) is placed in front of back portion 1416 so that an area of opening 418 (FIG. 4) of the front cover may extend outside an area of a front face 1426 of back portion 1416. In another alternative embodiment, a square display panel is used instead of rectangular display panel 1402.

In yet another alternative embodiment, front cover 702 (FIG. 7) is placed in front of back portion 1416 so that an area of opening 718 (FIG. 7) of the front cover does not extend outside an area of front face 1426 of back portion 1416. For example, front cover 702 is placed in front of back portion 1416 so that extended portion 1424 is not visible to a player standing in front of the front cover 702. In this case, rectangular display panel 1402 appears to a player to be of the same shape as that of opening 718, which is tombstone-shaped. The rectangular display panels 1402 are enclosed between front cover 702 and back cover 714 (FIG. 7). Each such rectangular display panel 1402 enclosed in top box 302 formed by the front and back covers 702 and 714 may be of a different size than the other rectangular display panel 1402 also enclosed in the same enclosure.

Figure 15:
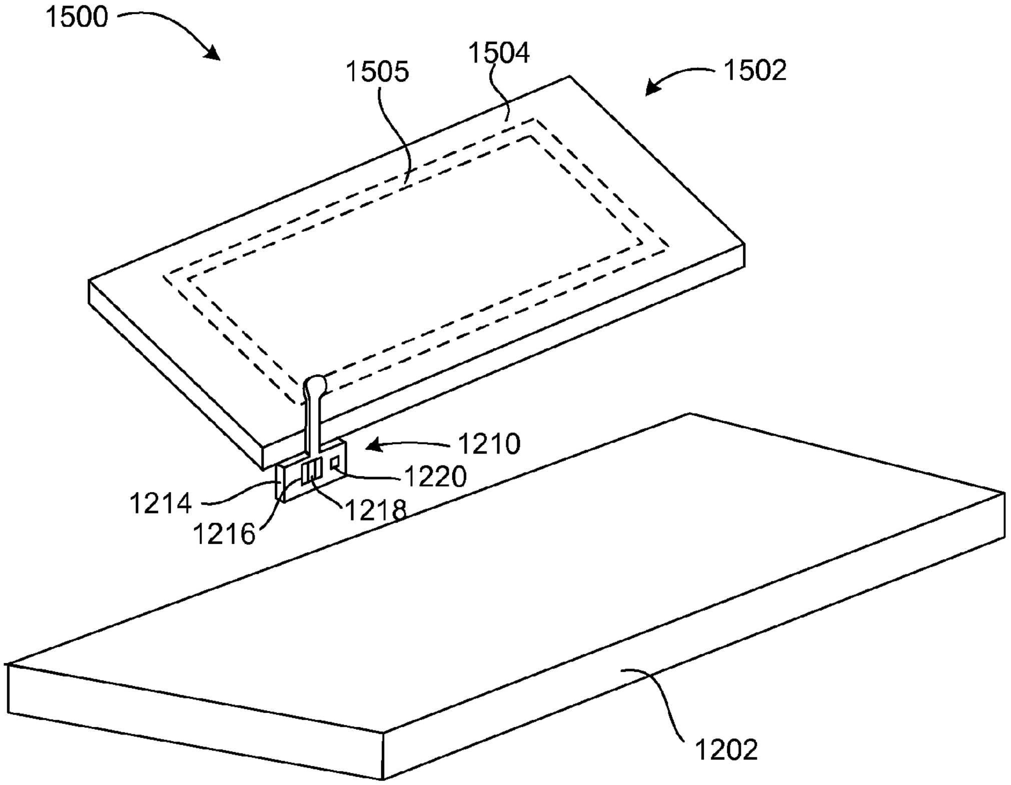
FIG. 15 is a schematic view of an embodiment of a system used to form a rectangular display panel from a pair of substrates.

FIG. 15 shows an illustrative cutting system 1500 used to cut rectangular display panel 1402 and extended portion 1424 from pair of substrates 1408 (FIG. 14). Cutting system 1500 is similar to cutting system 1200 except that it includes a rectangular-shaped cutting apparatus 1502 having a top portion 1504 and rectangular-shaped channel 1505. As such, cutting tool 1210 is movably fixed to rectangular-shaped channel 1505 to be moved along rectangular-shaped channel 1505.

Figure 16:
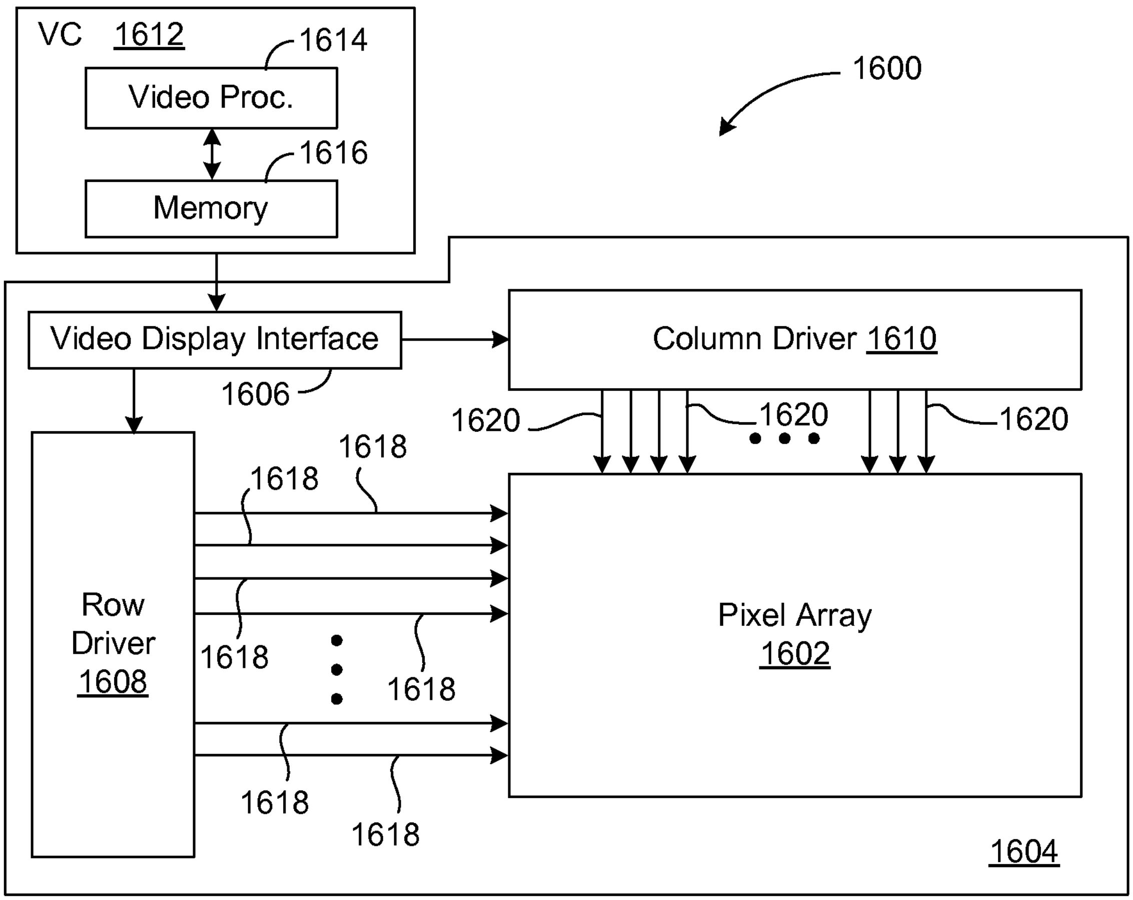
FIG. 16 is a block diagram of a system for operating a pixel array of the system of FIG. 3.

FIG. 16 is a block diagram of an embodiment of a system 1600 for operating a pixel array 1602. Pixel array 1602 forms part of a display screen 1604. System 1600 includes a secondary video controller 1612, such as secondary video controller 336 (FIG. 3) or secondary video controller 338 (FIG. 3). Secondary video controller 1612 is secondary video controller 338 (FIG. 3) if screen 1604 is foreground screen 342 (FIG. 3), and secondary video controller 1612 is secondary video controller 336 (FIG. 3) if screen 1604 is background screen 344 (FIG. 3).

Screen 1604 includes a video display interface 1606, a row driver 1608, pixel array 1602, and a column driver 1610. Each of circular display panel 1002 (FIG. 10), tombstone-shaped display panel 1102 (FIG. 11), and rectangular-shaped display panel 1402 is used to fabricate pixel array 1602 and does not include a liquid crystal material. Pixel array 1602 is fabricated from rectangular-shaped display panel 1402 after insertion of liquid crystal material between the color filter and thin film transistor substrates of back portion 1416.

Row driver 1608 is a gate driver and column driver 1610 is a source driver. Row driver 1608 is connected to pixel array 1602 via a plurality of row lines 1618 and column driver 1610 is connected to pixel array 1602 via a plurality of column lines 1620. For example, each pixel of pixel array 1602 is connected to row driver 1608 via a row line 1618, and each pixel is connected to column driver 1610 via a column line 1620. Secondary video controller 1612 includes a secondary video processor 1614 and a memory device 1616, such as a RAM or a combination of a RAM and a ROM. Secondary video processor 1614 interfaces with row driver 1608 and column driver 1610 via video display interface 1606.

During execution of the secondary game code by CPU 308, secondary video processor 1614 receives a set of signals from CPU 308 and generates a set of video signals, which represent a set of frames displayed on pixel array 1602. For example, during execution of the secondary game code, secondary video processor 1614 receives a set of instructions to generate foreground image 422 (FIG. 4) on pixel array 1602 and processes the set of instructions to generate a set of video signals representing the foreground image 422. As another example, during execution of the secondary game code, secondary video processor 1614 receives an instruction to generate a background image, such as background image 426 (FIG. 4) or background image 610 (FIG. 6), and processes the instruction to generate a set of video signals representing the background image. The set of video signals may be formatted by secondary video processor 1614 in a red, green, blue (RGB) format or any other format.

Video display interface 1606 receives the set of video signals from secondary video processor 1614. If the set of video signals is received over a serial communication channel from secondary video processor 1614, video display interface 1606 includes a deserializer that deserializes the video signals of the set. Video display interface 1606 recovers red, green and blue pixel data encoded in the set of video signals and sends the pixel data to the source driver. Video display interface 1606 further includes a timing signal generator (not shown), which may be a clock oscillator, that generates a pixel clock signal and other timing control signals, such as a pixel clock enable signal. The timing signal generator supplies the pixel clock signal to the gate driver.

Based on the pixel data, a source driver supplies an amount of current to a source of a transistor, such as a thin film transistor, of each pixel of pixel array 1602. The current may be stored in a capacitor (not shown) of each pixel of pixel array 1602. Each pixel 1004, 1006 (FIGS. 10 and 14), 1104 (FIG. 11), and 1106 (FIG. 11) is an example of a pixel of pixel array 1602. Based on the pixel clock, the gate driver supplies a pulse to a gate of a transistor, such as a thin film transistor, of each pixel a row of pixel array 1602 and the transistor is gated on upon receiving the pulse.

If pixel array 1602 is included within an LCD display device, during a time a transistor, such as a thin film transistor, of a pixel of pixel array 1602 is gated on, an amount of current received by the transistor from row driver 1608 via row line 1618 determines an amount of voltage stored in a capacitor of the pixel and the amount of voltage determines an amount of twist of liquid crystal between the thin film transistor substrate and the color filter substrate of that pixel. For example, as the amount of voltage stored in a capacitor of a pixel of pixel array 1602 increases, an amount of twist of liquid crystal of the pixel changes to allow more light from light source 412 (FIG. 4), light source 608 (FIG. 6), or ring-shaped light source 410 (FIG. 4) to pass through the pixel. As another example, as the amount of voltage stored in a capacitor of a pixel of pixel array 1602 decreases, an amount of twist of liquid crystal of the pixel changes to allow less light from light source 412 (FIG. 4), light source 608 (FIG. 6), or ring-shaped light source 410 to pass through the pixel.

If pixel array 1602 is an LED pixel array 1602, such as an OLED pixel array, during a time that a transistor of a pixel of pixel array 1602 is gated on, an amount of current received by the transistor from row driver 1608 via row line 1618 determines an amount of voltage stored in a capacitor of the pixel and the amount of voltage determines an intensity of light emitted by an LED of the pixel. For example, as an amount of voltage stored in a capacitor of a pixel of pixel array 1602 increases, the intensity of light emitted by an LED of the pixel increases. As another example, as an amount of voltage stored in a capacitor of a pixel of pixel array 1602 decreases, the intensity of light emitted by an LED of the pixel decreases.

Advantages of the systems and methods, described above, include improving play of a wheel-based bonus game on a gaming machine. The play of the wheel-based bonus game is improved by increasing player interest and excitement while playing the bonus game. For example, a player who plays the wheel-based bonus game represented by a multilayer display, such as secondary display device 130 or 206, will more likely to be excited to play the game than a player who plays a bonus game represented by a single layer display (FIGS. 1 and 2). For example, movement of the foreground image between the foreground and background screens, or movement of the wheel between the background and foreground screens keeps a player interested in playing the bonus game.

Figure 17:
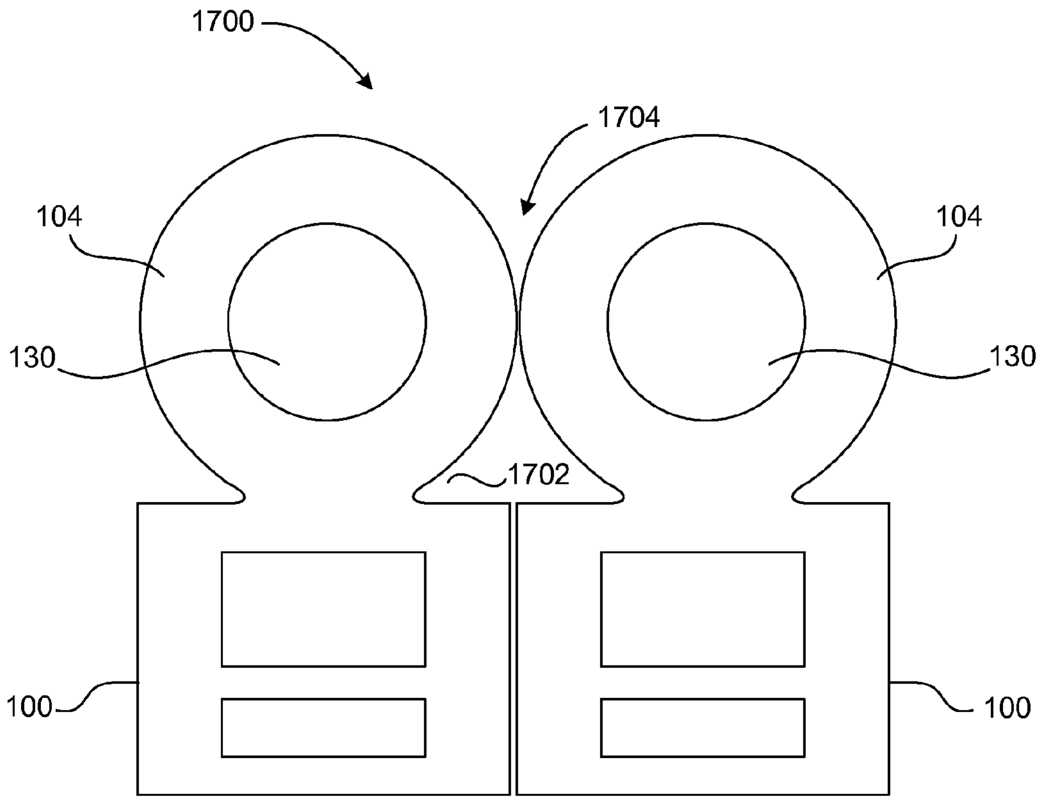
FIG. 17 is a front view of a gaming machine system located within a gaming establishment.

FIG. 17 is a front view of an embodiment of a system 1700 located within gaming establishment 301. System 1700 includes a plurality of gaming machines 100 (FIG. 1). Gaming machine 200 (FIG. 2) may also be used in this system. As shown, a bottom gap 1702 is formed between top boxes 104 of gaming machines 100 as a result of the circular shape of each top box 104. A top gap 1704 is also created between top boxes 104 of gaming machines 100. Top gap 1704 and/or bottom gap 1702 allow security personnel of gaming establishment 301 to observe an attempted theft or other unauthorized activity via the gaps 1702 and/or 1704. A thief may be attempting to steal property, such as cash, gaming chips, electronic equipment, or other valuables, from gaming establishment 301.

Further, people within gaming establishment 301 are able to view a designation, such as an 'Exit' sign, within the gaming establishment via gaps 1702 and/or 1704 during an emergency situation, for instance, a fire spreading within the gaming establishment or other calamity.

The fact that secondary display device 130 has the same or similar shape as that of top box 104 facilitates the formation of gaps 1702 and 1704. As noted, this improves both security and safety within gaming establishment 301 by improving visibility.

Additionally, when gaming machine 200 (FIG. 2) having tombstone-shaped top box 202 is placed side-by-side to another gaming machine 200 (FIG. 2), a top gap, similar to top gap 1704, and bottom gap, similar to bottom gap 1704, are formed between the gaming machines 200. As discussed, this arrangement improves both security and safety within gaming establishment 301.

It is noted that in further embodiments, gaming machines 100/200 described herein may be used to play a game for fun rather than for an expectation of value from the gaming machine. For example, the gaming machines described herein may not facilitate a reception of an input of value from a user or to output value to the user.

It should be appreciated that gaming machine 100/200 as disclosed herein may be a device that has obtained approval from a regulatory gaming commission. Gaming machine 100/200 is implemented with special features and/or additional circuitry that differentiates gaming machine 100/200 from general-purpose computers (e.g., desktop personal computer (PC) and laptops). Gaming machine 100/200 is regulated to ensure fairness and, in many cases, gaming machine 100/200 is operable to dispense monetary awards of multiple millions of dollars. Therefore, to satisfy security and regulatory requirements in gaming establishment 301, hardware and software architectures may be implemented in gaming machine 100/200 that differ from those of general-purpose computers. A description of gaming machine 100/200 relative to general-purpose computing machines and some examples of the additional (or different) components and features found in gaming machine 100/200 are described below.

At first glance, one might think that adapting PC technologies to the gaming industry would be a simple proposition because both PCs and gaming machine 100/200 employ microprocessors that control a variety of devices. However, because of such reasons as 1) the regulatory requirements that are placed upon gaming machine 100/200, 2) the harsh environment in which gaming machine 100/200 operates, 3) security requirements and 4) fault tolerance requirements, adapting PC technologies to gaming machine 100/200 can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in the gaming machine these faults can lead to a direct loss of funds from gaming machine, such as stolen cash or loss of revenue when gaming machine is not operating properly.

For the purposes of illustration, a few differences between PC systems and gaming machine 100/200 will be described. A first difference between a gaming machine and common PC based computers systems is that a gaming machine is designed to be a state-based system. The state-based system stores and maintains its current state in a non-volatile memory, such that, in the event of a power failure or other malfunction of the gaming machine will return to its current state when the power is restored. For instance, if a user was shown an award for a game of chance or game of skill and, before the award could be provided to the user the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on gaming machines.

A second important difference between gaming machine 100/200 and common PC based computer systems is that for regulation purposes, the software on gaming machine used to generate a game of chance or game of skill and operate the gaming machine has been designed to be static and monolithic to prevent cheating by a user of the gaming machine. For instance, one solution that has been employed in the gaming industry to prevent cheating and satisfy regulatory requirements has been to manufacture gaming machines that can use CPU 308 running instructions to generate a game of chance or game of skill, such as the primary game or the secondary game, from an EPROM or other form of non-volatile memory. The coding instructions on an EPROM of a gaming machine are static (non-changeable) and are approved by a gaming regulator in a particular jurisdiction and installed in the presence of a person representing the gaming jurisdiction. Any changes to any part of the software used to generate a game of chance or game of skill, such as adding a new device driver used by CPU 308 to operate a device during generation of a game of chance or game of skill can require a new EPROM to be burnt, approved by the gaming jurisdiction and reinstalled on gaming machine in the presence of a gaming regulator. Regardless of whether an EPROM solution is used in the gaming machine, to gain approval in most gaming jurisdictions, the gaming machine must demonstrate sufficient safeguards that prevent a user of the gaming machine from manipulating hardware and software in a manner that gives the user an unfair and some cases an illegal advantage. The gaming machine has a means to determine if the code it will execute is valid. If the code is not valid, gaming machine has means to prevent the code from being executed. The code validation requirements in the gaming industry affect both hardware and software designs on gaming machines.

A third important difference between gaming machine 100/200 and common PC based computer systems is the number and kinds of peripheral devices used on a gaming machine are not as great as on PC based computer systems. In the gaming industry, a gaming machine has been relatively simple in the sense that the number of peripheral devices and the number of functions has been limited. Further, in operation, the functionality of a gaming machine is relatively constant once it is deployed, i.e., new peripherals devices and new gaming software were infrequently added to a gaming machine. This differs from a PC where a user will go out and buy different combinations of devices and software from different manufacturers and connect them to a PC to suit their needs depending on a desired application. Therefore, the types of devices connected to a PC may vary greatly from person to person depending on their individual requirements and may vary significantly over time.

Although the variety of devices available for a PC may be greater than on gaming machine 100/200, a gaming machine still has unique device requirements that differ from a PC, such as device security requirements not usually addressed by PCs. For instance, monetary devices, such as coin dispensers, bill or ticket validator 120 and ticket printer 136, that are used to govern the input and output of cash to gaming machine 100/200 have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machine 100/200 that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in gaming machine 100/200 to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some preferred circuits is that the operating software cannot completely disable the function of the watchdog timer. In other words, the watchdog timer always functions from the time power is applied to the board.

Gaming machine 100/200 preferably uses several power supply voltages to operate portions of circuitry of gaming machine 100/200. These can be generated in a central power supply or locally on a processor board of a gaming machine. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. A gaming machine typically has power supplies with tighter voltage margins than that required by the operating circuitry. In addition, the voltage monitoring circuitry implemented in gaming machine 100/200 typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming machine.

The standard method of operation for gaming machine software, such as the primary or secondary game code, is to use a state machine. Different functions of the game (bet, play, result, points in the graphical presentation, etc.) may be defined as a state. When a game, such as the primary game or the secondary game, moves from one state to another, critical data regarding the game is stored in a custom non-volatile memory subsystem. This is critical to ensure a user's wager and credits are preserved and to minimize potential disputes in the event of a malfunction on the gaming machine.

In general, gaming machine 100/200 does not advance from a first state to a second state until critical information that enables the first state to be reconstructed is stored. This feature enables the game to recover operation to the current state of play in the event of a malfunction, loss of power, etc that occurred just prior to the malfunction. After the state of the gaming machine is restored during the play of a game of chance or game of skill, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance or game of skill, gaming machine 100/200 may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance or game of skill where a user is required to make a number of selections on a video display screen, such as primary display device 112 (FIG. 1) or secondary display device 340 (FIG. 3). When a malfunction has occurred after the player has made one or more selections, the gaming machine may be restored to a state that shows the graphical presentation at the just prior to the malfunction including an indication of selections that have already been made by a user. In general, a gaming machine may be restored to any state in a plurality of states that occur in a game of chance or game of skill that occurs while a game of chance or game of skill is played or to states that occur between the play of the game of chance or game of skill.

Game history information regarding previous games played such as an amount wagered, the outcome of a game and so forth may also be stored in a non-volatile memory device of gaming machine 100/200. The information stored in the non-volatile memory may be detailed enough to reconstruct a portion of the graphical presentation that was previously presented on a gaming machine and the state of the gaming machine (e.g., credits) at the time a game of chance or game of skill was played. The game history information may be utilized in the event of a dispute. For example, a user may decide that in a previous game of chance or game of skill that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. Pat. No. 7,111,141, titled, "Dynamic NV-RAM," and U.S. Pat. No. 7,384,339, titled, "Frame Capture of Actual Game Play," each of which is incorporated by reference herein in its entirety and for all purposes.

In particular embodiments, a state of gaming machine 100/200 may be reconstructed from game history information stored in multiple locations. For instance, in one embodiment, a gaming machine operable to provide an externally-controlled interface (ECI) and a game interface simultaneously may not store state information for the ECI but only for the game interface. Thus, to reconstruct the state of the gaming machine including the ECI in a dispute, after a malfunction or after a power-failure, game history information may have to be retrieved from a local memory source on the gaming machine and a remote memory source located on a remote host, such as a server connected to the gaming machine via network 328, that provides the ECI. For example, the remote memory source and the gaming machine may store correlation information, such as timing information or referential information, that allows events on the gaming machine to be correlated to events occurring on the remote host. The correlation information stored at the gaming machine and/or remote host may be used to synchronize the reconstruction of a game state on the gaming machine. In a particular embodiment, the remote host that provides ECI services to a gaming machine may provide an ECI that allows archival information regarding ECIs displayed on a gaming device to be retrieved.

Another feature of gaming machine 100/200 is that gaming machine 100/200 often includes unique interfaces, including serial interfaces, to connect to specific subsystems internal and external to gaming machine. The serial devices may have electrical interface requirements that differ from the "standard" Electronic Industries Association (EIA) 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in a gaming machine, serial devices may be connected in a shared, daisy-chain fashion where multiple peripheral devices are connected to a single serial channel.

The serial interfaces may be used to transmit information using communication protocols that are unique to the gaming industry. For example, International Game Technology (IGT) corporation's Netplex is a proprietary communication protocol used for serial communication between gaming devices. As another example, Slot Accounting System (SAS) is a communication protocol used to transmit information, such as metering information, from gaming machine 100/200 to the remote device. Often SAS is used in conjunction with a player tracking system.

Gaming machine 100/200 may alternatively be treated as a peripheral device to a casino communication controller and connected in a shared daisy chain fashion to a single serial interface. In both cases, the peripheral devices are preferably assigned device addresses. If so, the serial controller circuitry implements a method to generate or detect unique device addresses. General-purpose computer serial ports are not able to do this.

Security monitoring circuits detect intrusion into gaming machine 100/200 by monitoring security switches attached to access doors, such as main door 106, in gaming machine 100/200. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in gaming machine 100/200 to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within a gaming machine that can be tracked and verified as original. This may be accomplished via removal of the trusted memory device from the gaming machine and verification of the secure memory device contents in a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in the present systems and methods are described in U.S. Pat. No. 6,685,567 from U.S. patent application Ser. No. 09/925,098, filed Aug. 8, 2001 and titled "Process Verification," which is herein incorporated by reference in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

Gaming machine 100/200 storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. Pat. No. 7,515,718, entitled "Secured Virtual Network in a Gaming Environment", naming Nguyen et al. as inventors, filed on Mar. 10, 2005, herein incorporated by reference in its entirety and for all purposes.

Mass storage devices used in a general purpose computer typically enable code and data to be read from and written to the mass storage device. In gaming machine 100/200, modification of the gaming code stored on a mass storage device is strictly controlled and would only be enabled under specific maintenance type events with electronic and physical enablers required. Though this level of security could be provided by software, gaming machines that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Although the foregoing systems and methods have been described in detail by way of illustration and example for purposes of clarity and understanding, it will be recognized that the above described systems and methods may be embodied in numerous other specific variations and embodiments without departing from the spirit or essential characteristics of the systems and methods. Certain changes and modifications may be practiced, and it is understood that the systems and methods are not to be limited by the foregoing details, but rather is to be defined by the scope of the appended claims.

What is claimed is:

1. A gaming machine comprising:

an input device configured to receive an input from a user;

a first display device configured to display a primary game upon receiving the input;

a second multilayer display device configured to display a secondary game, wherein said multilayer display includes a foreground screen and a background screen, with at least a portion of one of said foreground screen and said background screen having a curved outer boundary and one of said foreground screen and said background screen configured to display an image of a wheel;

a controller configured to execute the primary and secondary games, wherein the secondary game is played after playing the primary game; and a light barrier disposed between the foreground screen and the background screen extending from and in contact with the foreground screen to and in contact with the background screen whereby light from or through an outer portion of the background screen will illuminate an outer portion of the foreground screen having a foreground image but will be prevented by the barrier from illuminating an inner portion of the foreground screen and light from or through an inner portion of the background screen will illuminate an inner portion of the foreground screen but will be prevented by the barrier from illuminating the outer portion of the foreground screen having the foreground image.

2. A gaming machine in accordance with claim 1, wherein the secondary game is initiated based on an outcome of the primary game.

3. A gaming machine in accordance with claim 1, wherein the primary game is initiated upon receiving a first wager from the user, and the secondary game is initiated upon receiving a second wager from the user.

4. A gaming machine in accordance with claim 1, wherein said gaming machine includes a secondary game initiation button, wherein the secondary game initiation button is other than said input device.

5. A gaming machine in accordance with claim 1, wherein said foreground screen has a circular shape or tombstone shape.

6. A gaming machine in accordance with claim 1, wherein said background screen has a circular shape or tombstone shape.

7. A gaming machine in accordance with claim 1, wherein said background screen is configured to display an image of the wheel including a plurality of segments, said controller being configured to change a number of credits or a description of a prize within at least one of the segments.

8. A gaming machine in accordance with claim 1, wherein said foreground screen is configured to display an image of the wheel and said background screen is configured to display an image of a set of graphical elements including at least one of a pointer and a bonus multiplier.

9. A gaming machine in accordance with claim 1, wherein said foreground screen is configured to display an image of a set of graphical elements including at least one of a pointer and a bonus multiplier and said background screen is configured to display an image of the wheel.

10. A gaming machine in accordance with claim 1, wherein said background screen is smaller than said foreground screen.

11. A gaming machine in accordance with claim 10, wherein said background screen has a smaller diameter than said foreground screen.

12. A gaming machine in accordance with claim 1, wherein said foreground screen includes a liquid crystal display (LCD) device or a light emitting diode (LED) display device and said background screen includes an LCD device or a light emitting diode (LED) display device.

13. A gaming machine in accordance with claim 1, wherein said multilayer display includes a light source configured to illuminate said background screen.

14. A gaming machine in accordance with claim 1, wherein said foreground screen and said background screen each include a set of pixels, wherein an interstitial layer is disposed between said foreground screen and said background screen to reduce interference between said set of pixels of said background screen and foreground screen.

15. A gaming method comprising:

receiving, via an input device, an input from a user;

displaying, via a first display device, a primary game upon receiving the input;

displaying, via a second multilayer display device having a foreground screen and a background screen, a secondary game including an image of a wheel, wherein a portion of at least one of the foreground screen and the background screen has a curved outer boundary, whereby the secondary game is displayed by use of a light barrier disposed between the foreground screen and the background screen and extending from and in contact with the foreground screen to and in contact with the background screen whereby light from or through an outer portion of the background screen or from a light source surrounding the background screen will illuminate an outer portion of the foreground screen having a foreground image but will be prevented by the barrier from illuminating an inner portion of the foreground screen having the foreground image and light from or through an inner portion of the background screen will illuminate an inner portion of the foreground screen but will be prevented by the barrier from illuminating an outer portion of the foreground screen; and executing, by a controller, at least one of the primary game and the secondary game, wherein the secondary game is played after the primary game.

16. A gaming method in accordance with claim 15, further comprising:

preventing light from illuminating the background screen or a portion of the foreground screen;

initiating the secondary game based on an outcome of the primary game.

17. A gaming method in accordance with claim 15, further comprising:

initiating the primary game upon receiving a first wager from the user; and initiating the secondary game upon receiving a second wager from the user.

18. A gaming method in accordance with claim 15, further comprising initiating the secondary game upon receiving an indication that a secondary game initiation button other than the input device of a gaming machine is activated.

19. A gaming method in accordance with claim 15, wherein the foreground screen has a shape of a foreground image displayed within the foreground screen, and the background screen has a shape of a background image displayed within the background screen.

20. A gaming system comprising:

a foreground screen configured to display a foreground image;

a background screen configured to display a background image, wherein a portion of at least one of said foreground screen and said background screen is curved, and the foreground image or the background image includes an image of a wheel;

a light barrier disposed between the foreground screen and the background screen extending from and in contact with the foreground screen to and in contact with the background screen whereby light from or through an outer portion of the background screen or from a light source surrounding the background screen will illuminate an outer portion of the foreground screen having a foreground image but will be prevented by the barrier from illuminating an inner portion of the foreground screen and light from or through an inner portion of the background screen will illuminate an inner portion of the foreground screen but will be prevented by the barrier from illuminating an outer portion of the foreground screen having the foreground image; and a controller configured to control the display of the foreground image and the background image after play of a primary game.

21. A gaming system in accordance with claim 20, further comprising a light barrier configured to prevent light from illuminating said background screen or a portion of said foreground screen, wherein the foreground and background images include images of a secondary game.

22. A gaming system in accordance with claim 21, wherein the secondary game is initiated based on an outcome of the primary game.

23. A gaming system in accordance with claim 21, wherein the primary game is initiated upon receiving a first wager from the user and the secondary game is initiated upon receiving a second wager from the user.

24. A gaming system in accordance with claim 21, wherein said foreground screen and said background screen have a circular or tombstone-shape.

25. A gaming system in accordance with claim 21, wherein said foreground screen has a shape of the foreground image displayed within said foreground screen, and said background screen has a shape of the background image displayed within said background screen.

26. A gaming method comprising:

displaying, via a foreground screen, a foreground image;

displaying, via a background screen, a background image, wherein a portion of at least one of the foreground screen and the background screen has a curved outer boundary, and the foreground image or the background image includes an image of a wheel;

displaying an image of a primary game on a screen other than said background screen or said foreground screen; and displaying the foreground image and the background image if a winning outcome is achieved by playing the primary game by use of a light barrier disposed between the foreground screen and the background screen extending from and in contact with the foreground screen to and in contact with the background screen whereby light from or through an outer portion of the background screen or from a light source surrounding the background screen will illuminate an outer portion of the foreground screen but will be prevented by the barrier from illuminating an inner portion of the foreground screen and light from or through an inner portion of the background screen will illuminate an inner portion of the foreground screen but will be prevented by the barrier from illuminating an outer portion of the foreground screen; and wherein the foreground image and background image include images of a secondary game.

27. A gaming method in accordance with claim 26, wherein the secondary game is initiated based on an outcome of the primary game.

28. A gaming machine comprising:

an input device configured to receive an input from a user;

a first display device configured to display a primary game upon receiving the input;

a second multilayer display device configured to display a secondary game, wherein said multilayer display includes a foreground screen and a background screen smaller in diameter than the foreground screen, with at least a portion of one of said foreground screen and said background screen having a curved outer boundary and one of said foreground screen and said background screen configured to display an image of a wheel;

a controller configured to execute the primary and secondary games, wherein the secondary game is played after playing the primary game;

a light source configured to direct light toward the foreground screen and configured to surround the background screen; and a light barrier disposed between the foreground screen and the background screen extending from and in contact with the foreground screen to and in contact with the background screen whereby light from the light source surrounding the background screen will illuminate an outer portion of the foreground screen but will be prevented by the barrier from illuminating an inner portion of the foreground screen and light from the light source will be prevented by the barrier from illuminating the background screen.

29. A gaming machine in accordance with claim 28, wherein said light source is a ring-shaped light source.

30. A gaming machine in accordance with claim 29, wherein a portion of said light barrier is concentric with a portion of said background screen and said foreground screen.

* * * * *